United States Patent
Boroni et al.

(10) Patent No.: US 12,006,194 B2
(45) Date of Patent: Jun. 11, 2024

(54) LIFT DEVICE WITH USER CONTACT SENSOR

(71) Applicant: Oshkosh Corporation, Oshkosh, WI (US)

(72) Inventors: Davide Boroni, Oshkosh, WI (US); Matteo Lavagnini, Oshkosh, WI (US); Roberto Marchesini, Oshkosh, WI (US); Zeno Poltronieri, Oshkosh, WI (US); Fredric L. Yutzy, Oshkosh, WI (US); Korry D. Kobel, Oshkosh, WI (US); John Hill, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/108,997

(22) Filed: Feb. 13, 2023

(65) Prior Publication Data

US 2023/0192464 A1    Jun. 22, 2023

Related U.S. Application Data

(63) Continuation of application No. 17/580,342, filed on Jan. 20, 2022, now Pat. No. 11,597,640.

(Continued)

(51) Int. Cl.
*B66F 11/04* (2006.01)
*G05B 15/02* (2006.01)

(52) U.S. Cl.
CPC .......... *B66F 11/044* (2013.01); *B66F 11/046* (2013.01); *G05B 15/02* (2013.01)

(58) Field of Classification Search
CPC ......... B66F 11/00; B66F 11/04; B66F 11/042; B66F 11/044; B66F 11/046; B66F 17/00;
(Continued)

(56) References Cited

U.S. PATENT DOCUMENTS

| 9,676,602 B2 * | 6/2017 | Cummings ........... B66F 11/046 |
| 10,549,975 B2 | 2/2020 | Wicklund et al. |

(Continued)

FOREIGN PATENT DOCUMENTS

| CN | 202379687 U | 8/2012 |
| CN | 205740245 U | 11/2016 |

(Continued)

OTHER PUBLICATIONS

Foreign Search Report on PCT PCT/US2022/013149 dated May 3, 2022 (12 pages).

(Continued)

*Primary Examiner* — Tyrone V Hall, Jr.
(74) *Attorney, Agent, or Firm* — Foley & Lardner LLP

(57) ABSTRACT

A lift device includes a chassis, a platform configured to support a user, a lift assembly coupling the platform to the chassis, an actuator configured to at least one of (a) move the platform relative to the chassis or (b) propel the chassis, a sensor assembly, and a controller. The sensor assembly includes a bar including a first end portion coupled to the platform and a second end portion opposite the first end portion and a housing defining an aperture sized to receive the second end portion of the bar. The sensor provides a signal in response to at least one of (a) the second end portion of the bar contacting the sensor or (b) the second end portion of the bar exiting the aperture. The controller is operatively coupled to the sensor and the actuator and configured to control the actuator based on the signal from the sensor.

20 Claims, 25 Drawing Sheets

Related U.S. Application Data

(60) Provisional application No. 63/140,037, filed on Jan. 21, 2021.

(58) Field of Classification Search
CPC .......... B66F 17/006; B66F 7/06; B66F 7/065; B66F 7/0658; B66F 7/0666; H01H 3/00; H01H 3/02; H01H 3/04; H01H 3/06; H01H 3/32; H01H 3/46; H01H 21/22; H01H 21/24; H01H 25/00; H01H 25/04
See application file for complete search history.

(56) References Cited

U.S. PATENT DOCUMENTS

| | | | |
|---|---|---|---|
| 11,161,726 | B2 | 11/2021 | Wicklund et al. |
| 2013/0233645 | A1 | 9/2013 | Hao et al. |
| 2015/0144426 | A1 | 5/2015 | Hao et al. |
| 2016/0075543 | A1 | 3/2016 | Lombardo et al. |
| 2016/0221812 | A1 | 8/2016 | Puszkiewicz et al. |
| 2018/0134534 | A1* | 5/2018 | Wicklund ............. B66F 11/044 |
| 2019/0152753 | A1 | 5/2019 | Vial et al. |
| 2022/0227613 | A1 | 7/2022 | Boroni et al. |

FOREIGN PATENT DOCUMENTS

| | | |
|---|---|---|
| CN | 205973674 U | 2/2017 |
| CN | 205973698 U | 2/2017 |
| CN | 108358136 A | 8/2018 |
| CN | 208249834 U | 12/2018 |
| CN | 110562886 A | 12/2019 |
| CN | 110723700 B | 10/2020 |
| EP | 2 096 078 A1 | 9/2009 |
| EP | 2 891 621 A1 | 7/2015 |
| EP | 3 002 249 A1 | 4/2016 |
| EP | 3 228 582 A2 | 10/2017 |
| FR | 3044652 | 6/2009 |
| FR | 3007401 | 5/2016 |
| GB | 2 472 440 | 2/2011 |
| GB | 2 472 441 | 2/2011 |
| GB | 2 481 709 | 1/2012 |
| JP | 2000-118997 A | 4/2000 |
| JP | 2001-226097 A | 8/2001 |
| JP | 2013-010588 A | 1/2013 |
| JP | 2013-010589 A | 1/2013 |
| KR | 20090002074 U | 3/2009 |
| WO | WO-2009/037429 A1 | 3/2009 |
| WO | WO-2015/004178 A1 | 1/2015 |
| WO | WO-2016/097139 A1 | 6/2016 |
| WO | WO-2016/097367 A1 | 6/2016 |
| WO | WO-2016/123005 A1 | 8/2016 |

OTHER PUBLICATIONS

Foreign Search Report on PCT PCT/US2022/013155 dated May 3, 2022 (12 pages).
JLG SkyGuard SkyLine Product, as described and shown in part in "'SkyGuard—Skyline' now available on JLG boom lifts." Construction Business News, Nov. 22, 2018 [retrieved on Aug. 16, 2022]. Retrieved from the Internet: <URL: https://www.cbnme.com/logistics-news/skyguard-skyline-now-available-on-jlg-boom-lifts/ >.

* cited by examiner

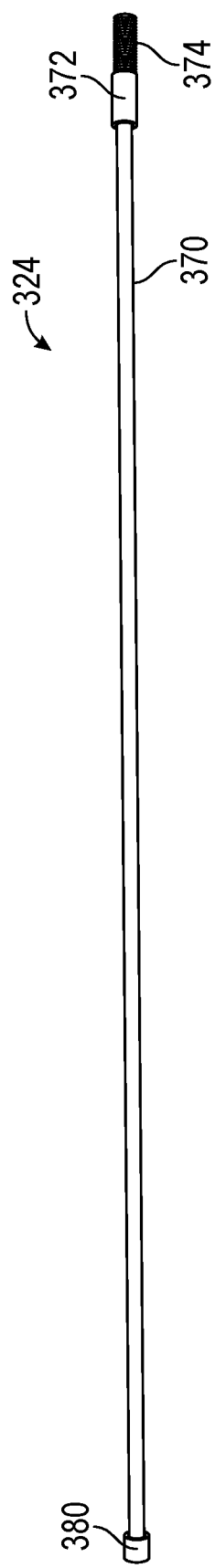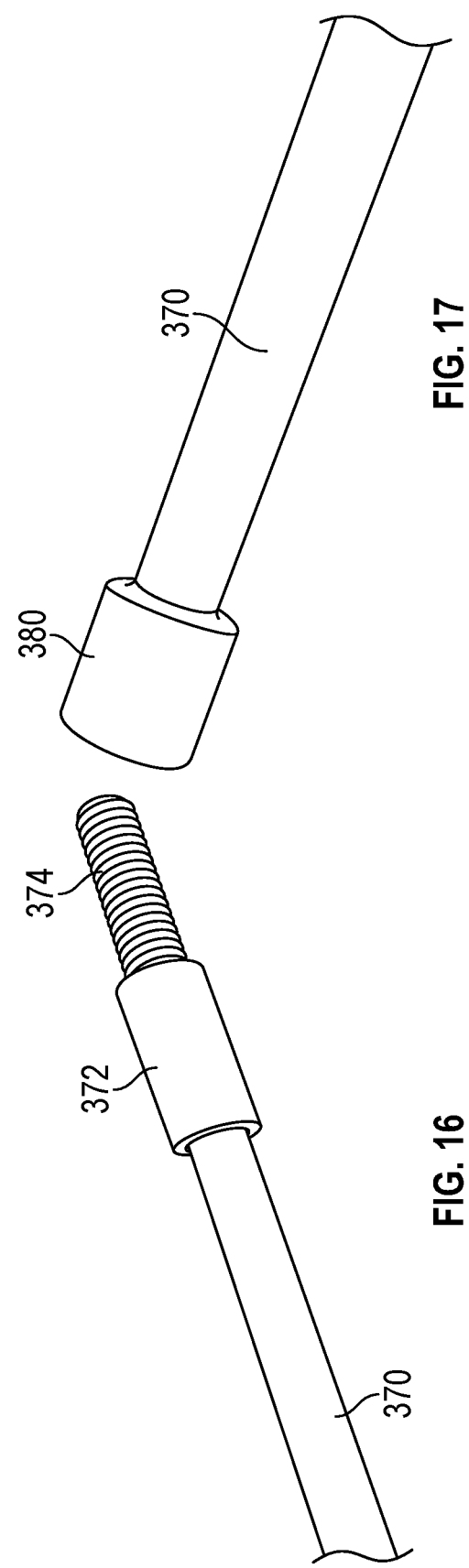

LIFT DEVICE WITH USER CONTACT SENSOR

CROSS-REFERENCE TO RELATED PATENT APPLICATIONS

This application is a continuation of U.S. application Ser. No. 17/580,342, filed on Jan. 20, 2022, which claims the benefit of and priority to U.S. Provisional Application No. 63/140,037, filed on Jan. 21, 2021, the entire disclosures of which are hereby incorporated by reference herein.

BACKGROUND

The present disclosure relates generally to the field of lift devices. More specifically, the present disclosure relates to sensor systems for lift devices.

Some lift devices include platforms that support a user. Such platforms are often supported by boom assemblies that facilitate vertical and/or horizontal movement of the platform as controlled by the user through a user interface. During operation, the user is typically positioned in front of the user interface when the platform is moving. As the boom assembly moves the platform, the platform may approach an obstacle (e.g., a wall, a tree branch, etc.). If the user is positioned between the user interface and the obstacle while the platform moves, the user's freedom of movement may be restricted.

SUMMARY

At least one embodiment relates to a lift device including a chassis, a platform configured to support a user, a lift assembly coupling the platform to the chassis, an actuator configured to at least one of (a) move the platform relative to the chassis or (b) propel the chassis, a sensor assembly, and a controller. The sensor assembly includes a bar including a first end portion coupled to the platform and a second end portion opposite the first end portion and a housing defining an aperture sized to receive the second end portion of the bar. The sensor provides a signal in response to at least one of (a) the second end portion of the bar contacting the sensor or (b) the second end portion of the bar exiting the aperture. The controller is operatively coupled to the sensor and the actuator and configured to control the actuator based on the signal from the sensor.

Another embodiment relates to a sensor assembly for a lift device. The sensor assembly includes a rod including a first end portion, a second end portion opposite the first end portion, and a resilient member extending between the first end portion and the second end portion. The sensor assembly further includes a hinge coupled to the first end portion of the rod and configured to pivotally couple the rod to a platform of the lift device. The sensor assembly further includes a housing configured to be coupled to the platform, the housing defining an aperture sized to receive the second end portion of the rod. The sensor assembly further includes a sensor configured coupled to the housing and configured to provide a signal in response to least one of (a) the second end portion of the rod contacting the sensor or (b) the second end portion of the rod exiting the aperture. The resilient member is configured to apply a biasing force to resist movement of the second end portion away from the sensor.

Another embodiment relates to a lift device including a chassis, a platform configured to support a user, the platform including a first rail and a second rail, a user interface coupled to the platform and positioned between the first rail and the second rail, a lift assembly coupling the platform to the chassis, an actuator configured to at least one of (a) move the platform relative to the chassis or (b) propel the chassis, a sensor assembly, and a controller. The sensor assembly includes a rod including (a) a first end portion coupled to the first rail, (b) a second end portion opposite the first end portion, and (c) a resilient member extending between the first end portion and the second end portion. The sensor assembly further includes a plate coupled to the second rail and defining an aperture sized to receive the second end portion of the rod. The sensor assembly further includes a sensor positioned to detect the second end portion of the rod when the second end portion of the rod is received by the aperture. The controller is operatively coupled to the sensor and the actuator and configured to control the actuator in response to an indication from the sensor that the second end portion of the rod has exited the aperture.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 15, 16, and 17 are various views of a bar assembly of the user contact sensor of FIG. 8;

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a lift device includes a platform configured to support a user, a chassis, and a lift assembly coupling the platform to the chassis. The user may control the lift assembly to raise, lower, or otherwise move the platform through a user interface coupled to the platform. In some situations, it may be possible for an obstacle in the environment to push the user toward the user interface while the lift assembly moves the platform. To limit or prevent this, the platform includes a user contact sensor positioned adjacent the user interface. The user contact sensor includes a bar assembly having a first end that is pivotally coupled to a rail. A second end of the bar assembly is received within a bar aperture of a sensing portion that is coupled to another rail. The bar assembly is positioned such that the upper body of the user will push against the bar assembly if the user is forced toward the user interface. This forces the second end of the bar assembly out of the bar aperture. The sensing portion includes a sensor that detects when the second end of the bar assembly is present within the bar aperture. In response to the sensor detecting that the bar has exited the bar aperture, a controller stops or reverses movement of the lift device.

Lift Device

Figure 1:
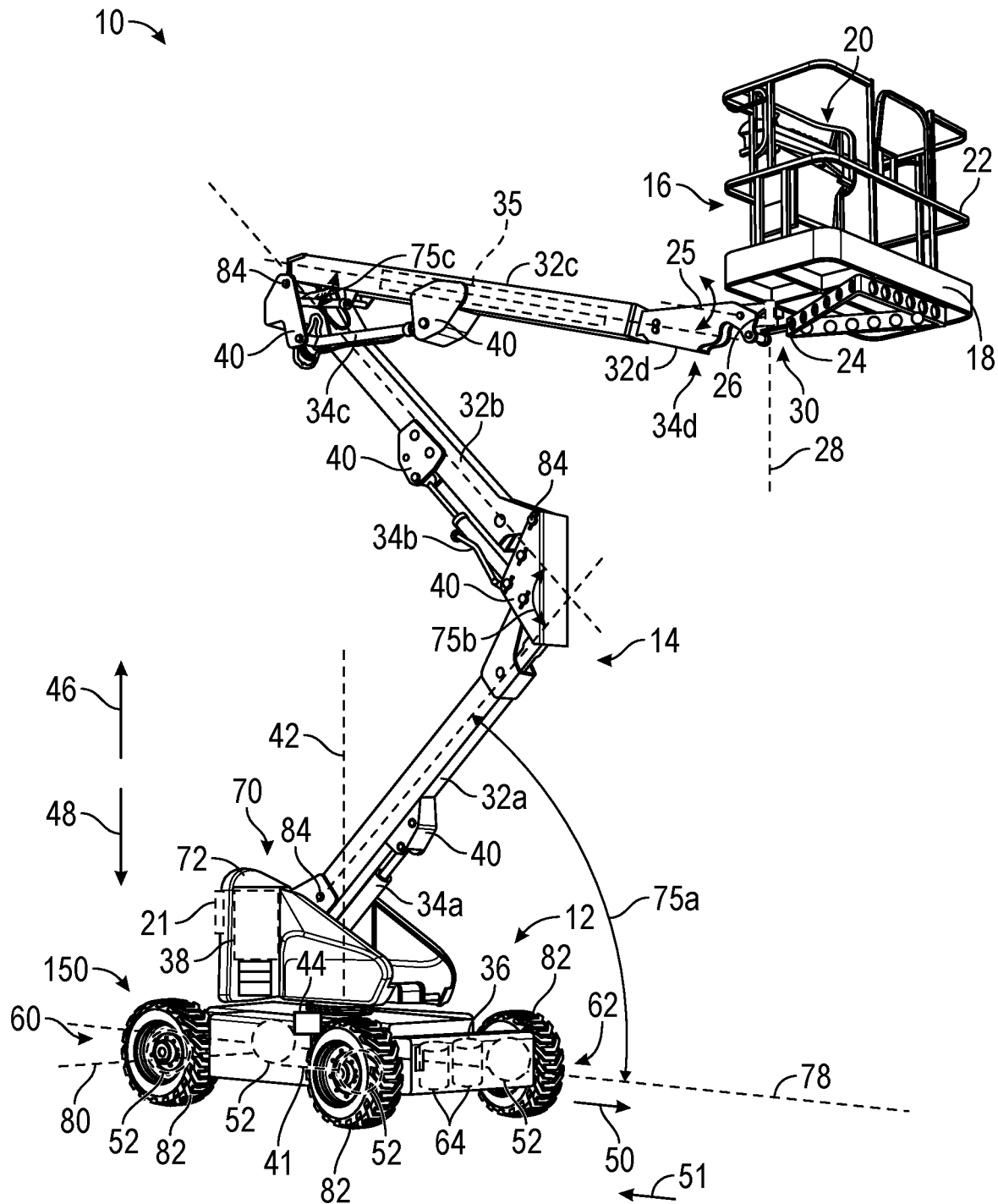
FIG. 1 is a front perspective view of a boom lift, according to an exemplary embodiment.

Referring to FIG. 1, a lifting apparatus, lift device, or mobile elevating work platform (MEWP) (e.g., a telehandler, an electric boom lift, a towable boom lift, a lift device, a fully electric boom lift, etc.), shown as lift device 10 includes a base assembly 12 (e.g., a base, a support assembly, a drivable support assembly, a support structure, a chassis, etc.), a platform assembly 16 (e.g., a platform, a terrace, etc.), and a lift assembly 14 (e.g., a boom, a boom lift assembly, a lifting apparatus, an articulated arm, a scissors lift, etc.). The lift device 10 includes a front end (e.g., a forward facing end, a front portion, a front, etc.), shown as front 62, and a rear end (e.g., a rearward facing end, a back portion, a back, a rear, etc.,) shown as rear 60. The lift assembly 14 is configured to elevate the platform assembly 16 in an upwards direction 46 (e.g., an upward vertical direction) relative to the base assembly 12. The lift assembly 14 is also configured to translate the platform assembly 16 in a downwards direction 48 (e.g., a downward vertical direction). The lift assembly 14 is also configured to translate the platform assembly 16 in either a forwards direction 50 (e.g., a forward longitudinal direction) or a rearwards direction 51 (e.g., a rearward longitudinal direction). The lift assembly 14 generally facilitates performing a lifting function to raise and lower the platform assembly 16, as well as movement of the platform assembly 16 in various directions.

The base assembly 12 defines a longitudinal axis 78 and a lateral axis 80. The longitudinal axis 78 defines the forward direction 50 of lift device 10 and the rearward direction 51. The lift device 10 is configured to translate in the forward direction 50 and to translate backwards in the rearward direction 51. The base assembly 12 includes one or more wheels, tires, wheel assemblies, tractive elements, rotary elements, treads, etc., shown as tractive elements 82. The tractive elements 82 are configured to rotate to drive (e.g., propel, translate, steer, move, etc.) the lift device 10. The tractive elements 82 can each include an electric motor 52 (e.g., electric wheel motors) configured to drive the tractive elements 82 (e.g., to rotate tractive elements 82 to facilitation motion of the lift device 10). In other embodiments, the tractive elements 82 are configured to receive power (e.g., rotational mechanical energy) from electric motors 52 or through a drive train (e.g., a combination of any number and configuration of a shaft, an axle, a gear reduction, a gear train, a transmission, etc.). In some embodiments, one or more tractive elements 82 are driven by a prime mover 41 (e.g., electric motor, internal combustion engine, etc.) through a transmission. In some embodiments, a hydraulic system (e.g., one or more pumps, hydraulic motors, conduits, valves, etc.) transfer power (e.g., mechanical energy) from one or more electric motors 52 and/or the prime mover 41 to the tractive elements 82. The tractive elements 82 and electric motors 52 (or prime mover 41) can facilitate a driving and/or steering function of the lift device 10.

Figure 4:
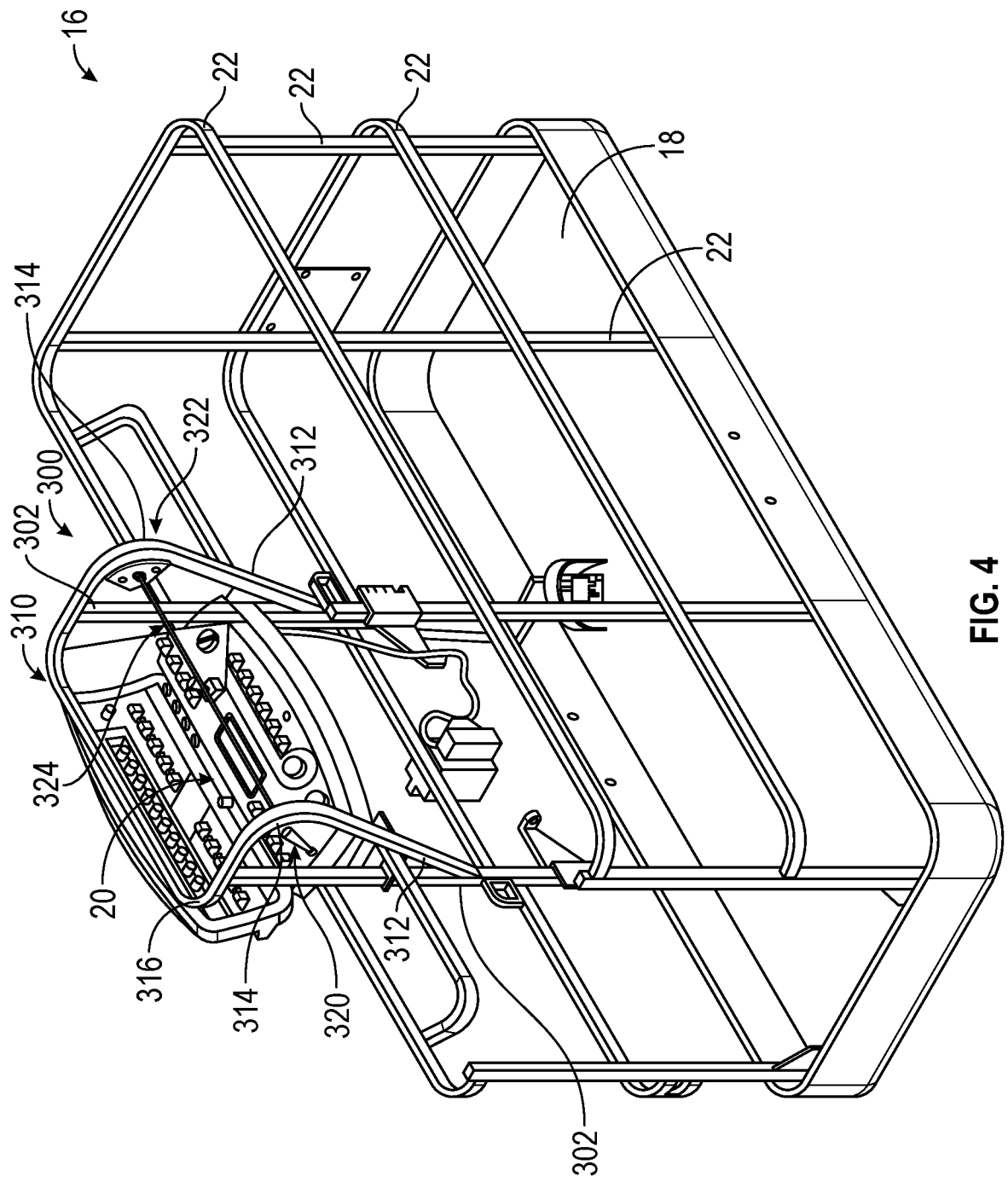
FIG. 4 is a front perspective view of a platform of the boom lift of FIG. 1.

With additional reference to FIG. 4, the platform assembly 16 is shown in further detail. The platform assembly 16 is configured to provide a work area for an operator of the lift device 10 to stand/rest upon. The platform assembly 16 can be pivotally coupled to an upper end of the lift assembly 14. The lift device 10 is configured to facilitate the operator accessing various elevated areas (e.g., lights, platforms, the sides of buildings, building scaffolding, trees, power lines, etc.). The lift device 10 may use various electrically-powered motors and electrically-powered linear actuators or hydraulic cylinders to facilitate elevation and/or horizontal movement (e.g., lateral movement, longitudinal movement) of the platform assembly 16 (e.g., relative to the base assembly 12, or to a ground surface that the base assembly 12 rests upon).

The platform assembly 16 includes a base member, a base portion, a platform, a standing surface, a shelf, a work platform, a floor, a deck, etc., shown as a deck 18. The deck 18 provides a space (e.g., a floor surface) for a worker to stand upon as the platform assembly 16 is raised and lowered.

The platform assembly 16 includes a railing assembly including various members, beams, bars, guard rails, rails, railings, etc., shown as rails 22. The rails 22 extend along substantially an entire perimeter of the deck 18. The rails 22 provide one or more members for the operator of the lift device 10 to grasp while using the lift device 10 (e.g., to grasp while operating the lift device 10 to elevate the platform assembly 16). The rails 22 can include members that are substantially horizontal to the deck 18. The rails 22 can also include vertical structural members that couple with the substantially horizontal members. The vertical structural members can extend upwards from the deck 18.

The platform assembly 16 can include a human machine interface (HMI) (e.g., a user interface, an operator interface, etc.), shown as the user interface 20. The user interface 20 is configured to receive user inputs from the operator at or upon the platform assembly 16 to facilitate operation of the lift device 10. The user interface 20 can include any number of buttons, levers, switches, keys, etc., or any other user input device configured to receive a user input to operate the lift device 10. The user interface 20 may also provide information to the user (e.g., through one or more displays, lights, speakers, haptic feedback devices, etc.). The user interface 20 can be supported by one or more of the rails 22.

Referring to FIG. 1, the platform assembly 16 includes a frame 24 (e.g., structural members, support beams, a body, a structure, etc.) that extends at least partially below the deck 18. The frame 24 can be integrally formed with the deck 18. The frame 24 is configured to provide structural support for the deck 18 of the platform assembly 16. The frame 24 can include any number of structural members (e.g., beams, bars, I-beams, etc.) to support the deck 18. The frame 24 couples the platform assembly 16 with the lift assembly 14. The frame 24 may be rotatably or pivotally coupled with the lift assembly 14 to facilitate rotation of the platform assembly 16 about an axis 28 (e.g., a vertical axis). The frame 24 can also rotatably/pivotally couple with the lift assembly 14 such that the frame 24 and the platform assembly 16 can pivot about an axis 25 (e.g., a horizontal axis).

The lift assembly 14 includes one or more beams, articulated arms, bars, booms, arms, support members, boom sections, cantilever beams, etc., shown as lift arms 32a, 32b, and 32c. The lift arms are hingedly or rotatably coupled with each other at their ends. The lift arms can be hingedly or rotatably coupled to facilitate articulation of the lift assembly 14 and raising/lowering and/or horizontal movement of the platform assembly 16. The lift device 10 includes a lower lift arm 32a, a central or medial lift arm 32b, and an upper lift arm 32c. The lower lift arm 32a is configured to hingedly or rotatably couple at one end with the base assembly 12 to facilitate lifting (e.g., elevation) of the platform assembly 16. The lower lift arm 32a is configured to hingedly or rotatably couple at an opposite end with the medial lift arm 32b. Likewise, the medial lift arm 32b is configured to hingedly or rotatably couple with the upper lift arm 32c. The upper lift arm 32c can be configured to hingedly interface/couple and/or telescope with an intermediate lift arm 32d. The upper lift arm 32c can be referred to as "the jib" of the lift device 10. The intermediate lift arm 32d may extend into an inner volume of the upper lift arm 32c and extend and/or retract. The lower lift arm 32a and the medial lift arm 32b may be referred to as "the boom" of the overall lift device 10 assembly. The intermediate lift arm 32d can be configured to couple (e.g., rotatably, hingedly, etc.), with the platform assembly 16 to facilitate levelling of the platform assembly 16.

The lift arms 32 are driven to hinge or rotate relative to each other by actuators 34a, 34b, 34c, and 34d (e.g., electric linear actuators, linear electric arm actuators, hydraulic cylinders, etc.). The actuators 34a, 34b, 34c, and 34d can be mounted between adjacent lift arms to drive adjacent lift arms to hinge or pivot (e.g., rotate some angular amount) relative to each other about pivot points 84. The actuators 34a, 34b, 34c, and 34d can be mounted between adjacent lift arms using any of a foot bracket, a flange bracket, a clevis bracket, a trunnion bracket, etc. The actuators 34a, 34b, 34c, and 34d may be configured to extend or retract (e.g., increase in overall length, or decrease in overall length) to facilitate pivoting adjacent lift arms to pivot/hinge relative to each other, thereby articulating the lift arms and raising or lowering the platform assembly 16.

The actuators 34a, 34b, 34c, and 34d can be configured to extend (e.g., increase in length) to increase a value of an angle formed between adjacent lift arms 32. The angle can be defined between centerlines of adjacent lift arms 32 (e.g., centerlines that extend substantially through a center of the lift arms 32). For example, the actuator 34a is configured to extend/retract to increase/decrease the angle 74a defined between a centerline of the lower lift arm 32a and the longitudinal axis 78 (angle 74a can also be defined between the centerline of the lower lift arm 32a and a plane defined by the longitudinal axis 78 and lateral axis 80) and facilitate lifting of the platform assembly 16 (e.g., moving the platform assembly 16 at least partially along the upward direction 46). Likewise, the actuator 34b can be configured to retract to decrease the angle 74a to facilitate lowering of the platform assembly 16 (e.g., moving the platform assembly 16 at least partially along the downward direction 48). Similarly, the actuator 34b is configured to extend to increase the angle 74b defined between centerlines of the lower lift arm 32a and the medial lift arm 32b and facilitate elevating of the platform assembly 16. Similarly, the actuator 34b is configured to retract to decrease the angle 74b to facilitate lowering of the platform assembly 16. The electric actuator 34c is similarly configured to extend/retract to increase/decrease the angle 74c, respectively, to raise/lower the platform assembly 16.

The actuators 34a, 34b, 34c, and 34d can be mounted (e.g., rotatably coupled, pivotally coupled, etc.) to adjacent lift arms at mounts 40 (e.g., mounting members, mounting portions, attachment members, attachment portions, etc.). The mounts 40 can be positioned at any position along a length of each lift arm. For example, the mounts 40 can be positioned at a midpoint of each lift arm, and a lower end of each lift arm.

The intermediate lift arm 32d and the frame 24 are configured to pivotally interface/couple at a platform rotator 30 (e.g., a rotary actuator, a rotational electric actuator, a gear box, etc.). The platform rotator 30 facilitates rotation of the platform assembly 16 about the axis 28 relative to the intermediate lift arm 32d. In some embodiments, the platform rotator 30 is positioned between the frame 24 and the upper lift arm 32c and facilitates pivoting of the platform assembly 16 relative to the upper lift arm 32c. The axis 28 extends through a central pivot point of the platform rotator 30. The intermediate lift arm 32d can also be configured to articulate or bend such that a distal portion of the intermediate lift arm 32d pivots/rotates about the axis 25. The intermediate lift arm 32d can be driven to rotate/pivot about axis 25 by extension and retraction of the actuator 34d.

The intermediate lift arm 32d is also configured to extend/retract (e.g., telescope) along the upper lift arm 32c. In some embodiments, the lift assembly 14 includes a linear actuator (e.g., a hydraulic cylinder, an electric linear actuator, etc.), shown as extension actuator 35, that controls extension and retraction of the intermediate lift arm 32d relative to the upper lift arm 32c. In other embodiments, one more of the other arms of the lift assembly 14 include multiple telescoping sections that are configured to extend/retract relative to one another.

The platform assembly 16 is configured to be driven to pivot about the axis 28 (e.g., rotate about axis 28 in either a clockwise or a counter-clockwise direction) by an electric or hydraulic motor 26 (e.g., a rotary electric actuator, a stepper motor, a platform rotator, a platform electric motor, an electric platform rotator motor, etc.). The motor 26 can be configured to drive the frame 24 to pivot about the axis 28 relative to the upper lift arm 32c (or relative to the intermediate lift arm 32d). The motor 26 can be configured to drive a gear train to pivot the platform assembly 16 about the axis 28.

Figure 2:
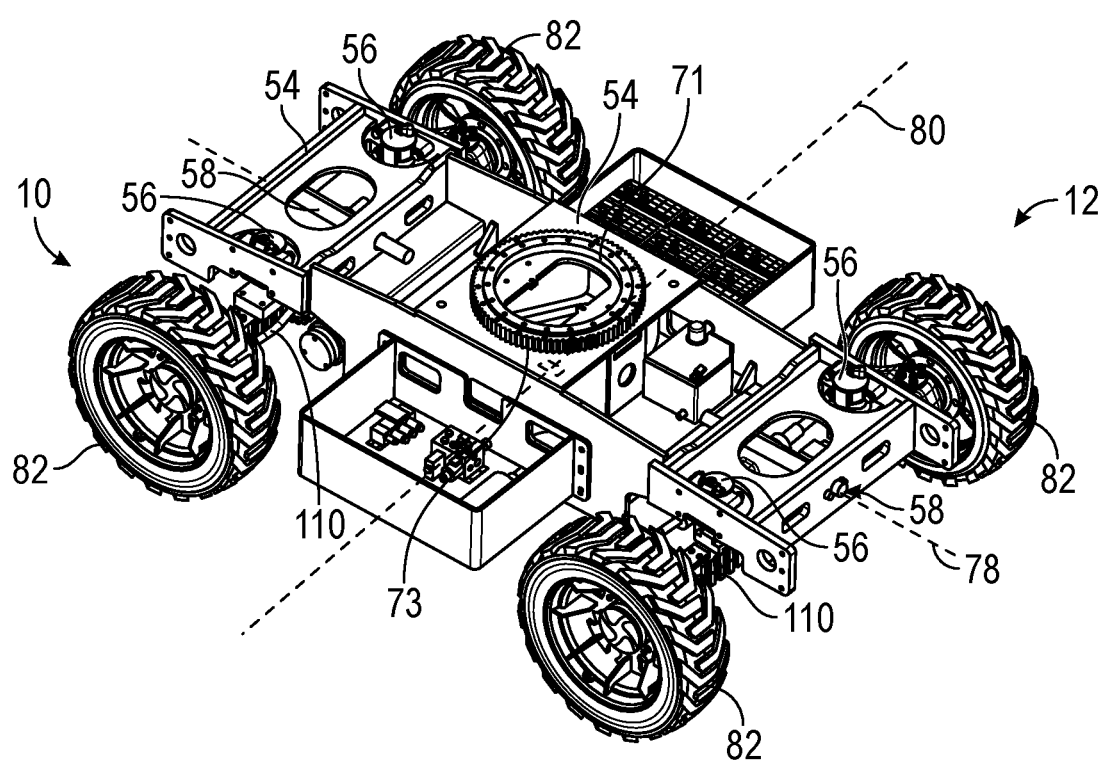
FIG. 2 is a top perspective view of a base assembly of the boom lift of FIG. 1, with a turntable removed.

Referring to FIGS. 1 and 2, the lift assembly 14 is configured to pivotally or rotatably couple with the base assembly 12. The base assembly 12 includes a rotatable base member, a rotatable platform member, a fully electric turntable, etc., shown as a turntable 70. The lift assembly 14 is configured to rotatably/pivotally couple with the base assembly 12. The turntable 70 is rotatably coupled with a base, frame, structural support member, carriage, etc., of base assembly 12, shown as base 36. The turntable 70 is configured to rotate or pivot relative to the base 36. The turntable 70 can pivot/rotate about the central axis 42 relative to base 36, about a slew bearing 71 (e.g., the slew bearing 71 pivotally couples the turntable 70 to the base 36). The turntable 70 facilitates accessing various elevated and angularly offset locations at the platform assembly 16. The turntable 70 is configured to be driven to rotate or pivot relative to base 36 and about the slew bearing 71 by an electric motor, an electric turntable motor, an electric rotary actuator, a hydraulic motor, etc., shown as the turntable motor 44. The turntable motor 44 can be configured to drive a geared outer surface 73 of the slew bearing 71 that is rotatably coupled to the base 36 about the slew bearing 71 to rotate the turntable 70 relative to the base 36. The lower lift arm 32a is pivotally coupled with the turntable 70 (or with a turntable member 72 of the turntable 70) such that the lift assembly 14 and the platform assembly 16 rotate as the turntable 70 rotates about the central axis 42. In some embodiments, the turntable 70 is configured to rotate a complete 360 degrees about the central axis 42 relative to the base 36. In other embodiments, the turntable 70 is configured to rotate an angular amount less than 360 degrees about the central axis 42 relative to the base 36 (e.g., 270 degrees, 120 degrees, etc.).

The base assembly 12 includes one or more energy storage devices or power sources (e.g., capacitors, batteries, Lithium-Ion batteries, Nickel Cadmium batteries, fuel tanks, etc.), shown as batteries 64. The batteries 64 are configured to store energy in a form (e.g., in the form of chemical energy) that can be converted into electrical energy for the various electric motors and actuators of the lift device 10. The batteries 64 can be stored within the base 36. The lift device 10 includes a controller 38 that is configured to operate any of the motors, actuators, etc., of the lift device 10. The controller 38 can be configured to receive sensory input information from various sensors of the lift device 10, user inputs from the user interface 20 (or any other user input device such as a key-start or a push-button start), etc. The controller 38 can be configured to generate control signals for the various motors, actuators, etc., of the lift device 10 to operate any of the motors, actuators, electrically powered movers, etc., of the lift device 10. The batteries 64 are configured to power any of the motors, sensors, actuators, electric linear actuators, electrical devices, electrical movers, stepper motors, etc., of the lift device 10. The base assembly 12 can include a power circuit including any necessary transformers, resistors, transistors, thermistors, capacitors, etc., to provide appropriate power (e.g., electrical energy with appropriate current and/or appropriate voltage) to any of the motors, electric actuators, sensors, electrical devices, etc., of the lift device 10.

The batteries 64 are configured to deliver power to the motors 52 to drive the tractive elements 82. A rear set of tractive elements 82 can be configured to pivot to steer the lift device 10. In other embodiments, a front set of tractive elements 82 are configured to pivot to steer the lift device 10. In still other embodiments, both the front and the rear set of tractive elements 82 are configured to pivot (e.g., independently) to steer the lift device 10. In some examples, the base assembly 12 includes a steering system 150. The steering system 150 is configured to drive tractive elements 82 to pivot for a turn of the lift device 10. The steering system 150 can be configured to pivot the tractive elements 82 in pairs (e.g., to pivot a front pair of tractive elements 82), or can be configured to pivot tractive elements 82 independently (e.g., four-wheel steering for tight-turns).

In some embodiments, the base assembly 12 also includes a user interface 21 (e.g., a HMI, a user interface, a user input device, a display screen, etc.). In some embodiments, the user interface 21 is coupled to the base 36. In other embodiments, the user interface 21 is positioned on the turntable 70. The user interface 21 can be positioned on any side or surface of the base assembly 12 (e.g., on the front 62 of the base 36, on the rear 60 of the base 36, etc.)

Figure 3:
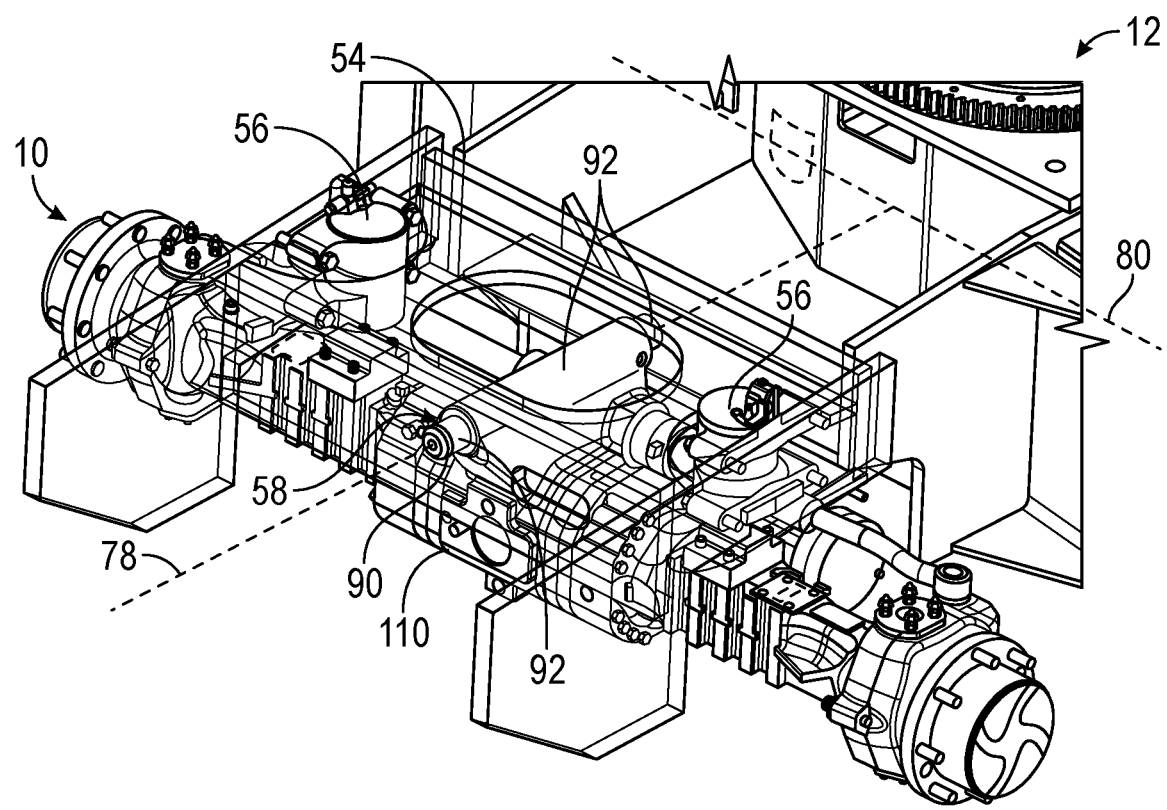
FIG. 3 is a top perspective view of a portion of the base assembly of FIG. 2.

Referring now to FIGS. 2 and 3, the base assembly 12 includes a longitudinally extending frame member 54 (e.g., a rigid member, a structural support member, an axle, a base, a frame, a carriage, a chassis, etc.). The longitudinally extending frame member 54 provides structural support for the turntable 70 as well as the tractive elements 82. The longitudinally extending frame member 54 is pivotally coupled with lateral frame members 110 (e.g., axles, frame members, beams, bars, etc.) at opposite longitudinal ends of the longitudinally extending frame member 54. For example, the lateral frame members 110 may be pivotally coupled with the longitudinally extending frame member 54 at a front end and a rear end of the longitudinally extending frame member 54. The lateral frame members 110 can each be configured to pivot about a pivot joint 58 (e.g., about a longitudinal axis). The pivot joint 58 can include a pin and a receiving portion (e.g., a bore, an aperture, etc.). The pin of the pivot joint 58 is coupled to one of the lateral frame members 110 (e.g., a front lateral frame member 110 or a rear lateral frame member 110) or the longitudinally extending frame member 54 and the receiving portion is coupled to the other of the longitudinally extending frame member 54 and the lateral frame member 110. For example, the pin may be coupled with longitudinally extending frame member 54 and the receiving portion can be coupled with one of the lateral frame members 110 (e.g., integrally formed with the front lateral frame member 110).

In some embodiments, the longitudinally extending frame member 54 and the lateral frame members 110 are integrally formed or coupled (e.g., fastened, welded, riveted, etc.) to define the base 36. In still other embodiments, the base 36 is integrally formed with the longitudinally extending frame member 54 and/or the lateral frame members 110. In still other embodiments, the base 36 is coupled with the longitudinally extending frame member 54 and/or the lateral frame members 110.

The base assembly 12 includes one or more axle actuators 56 (e.g., electric linear actuators, electric axle actuators, electric levelling actuators, hydraulic cylinders, etc.). The axle actuators 56 can be linear actuators configured to receive power from the batteries 64, for example. The axle actuators 56 can be configured to extend or retract to contact a top surface of a corresponding one of the lateral frame members 110. When the axle actuators 56 extend, an end of a rod of the levelling actuators can contact the surface of lateral frame member 110 and prevent relative rotation between lateral frame member 110 and longitudinally extending frame member 54. In this way, the relative rotation/pivoting between the lateral frame member 110 and the longitudinally extending frame member 54 can be locked (e.g., to prevent rolling of the longitudinally extending frame member 54 relative to the lateral frame members 110 during operation of the lift assembly 14). The axle actuators 56 can receive power from the batteries 64, which can allow the axle actuators 56 to extend or retract. The axle actuators 56 receive control signals from controller 38.

Control System

Figure 5:
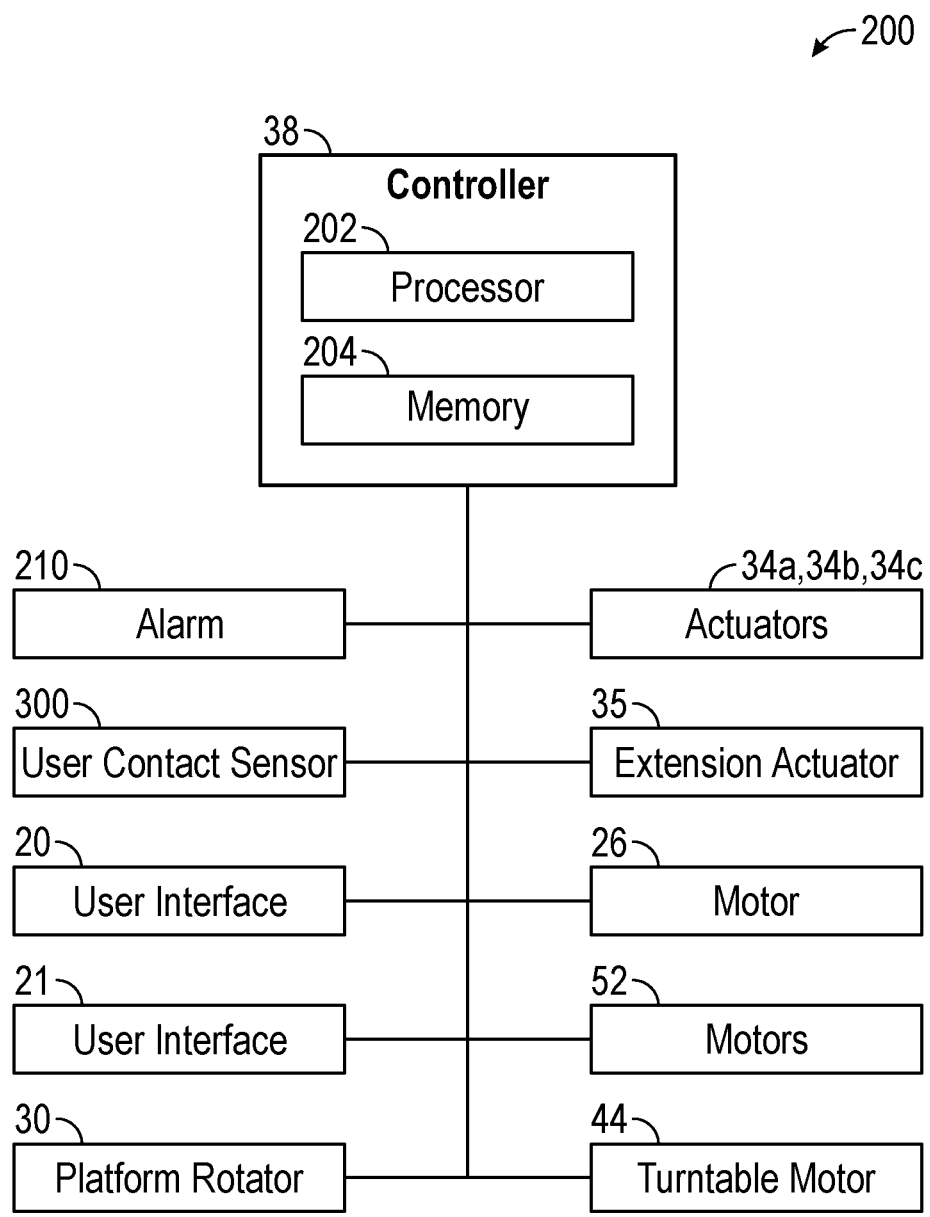
FIG. 5 is a block diagram of a control system of the boom lift of FIG. 1.
Figure 6:
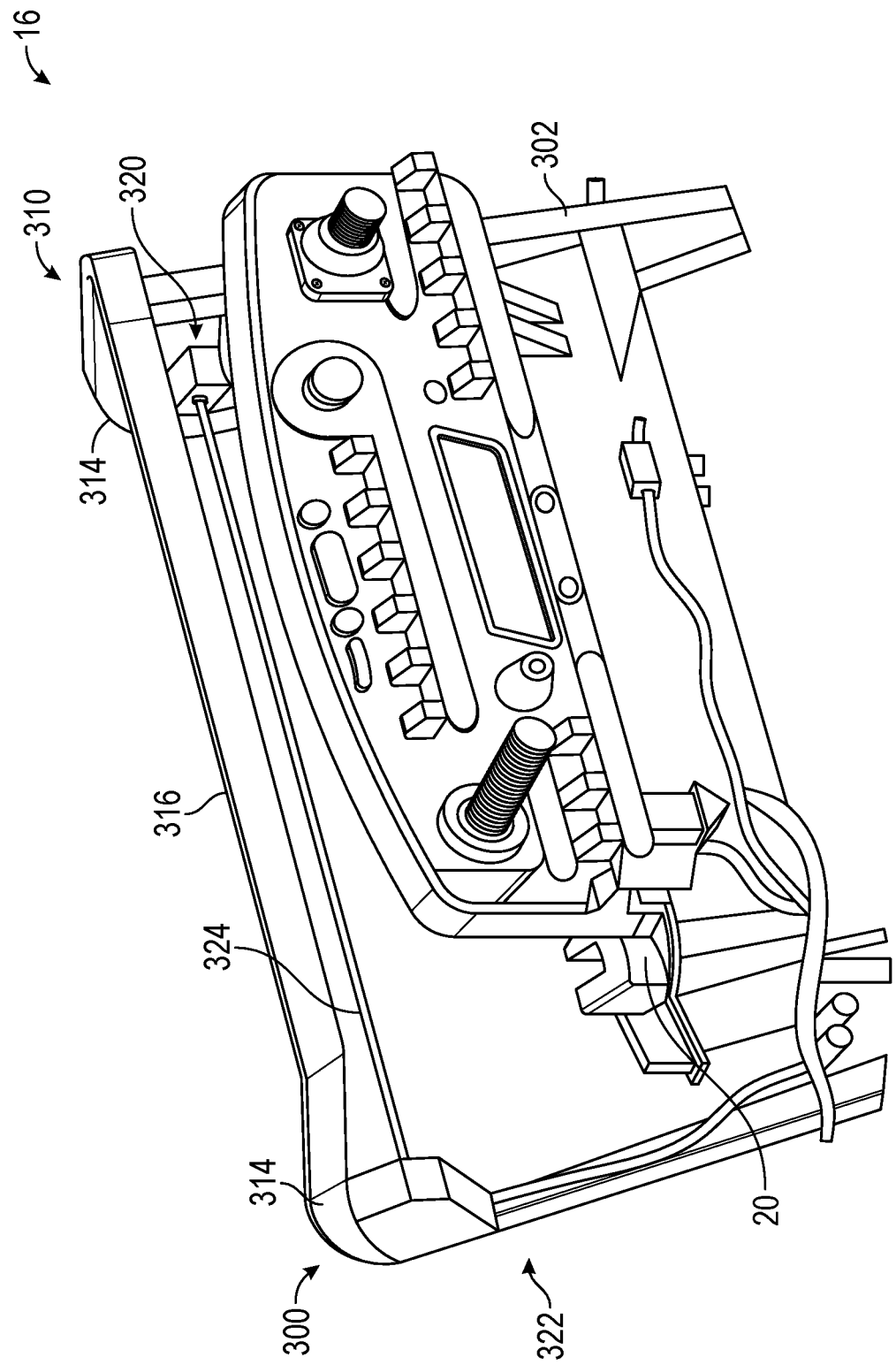
FIG. 6 is rear perspective view of a user interface and a railing of the platform of FIG. 4 with the user interface in a maintenance position.
Figure 7:
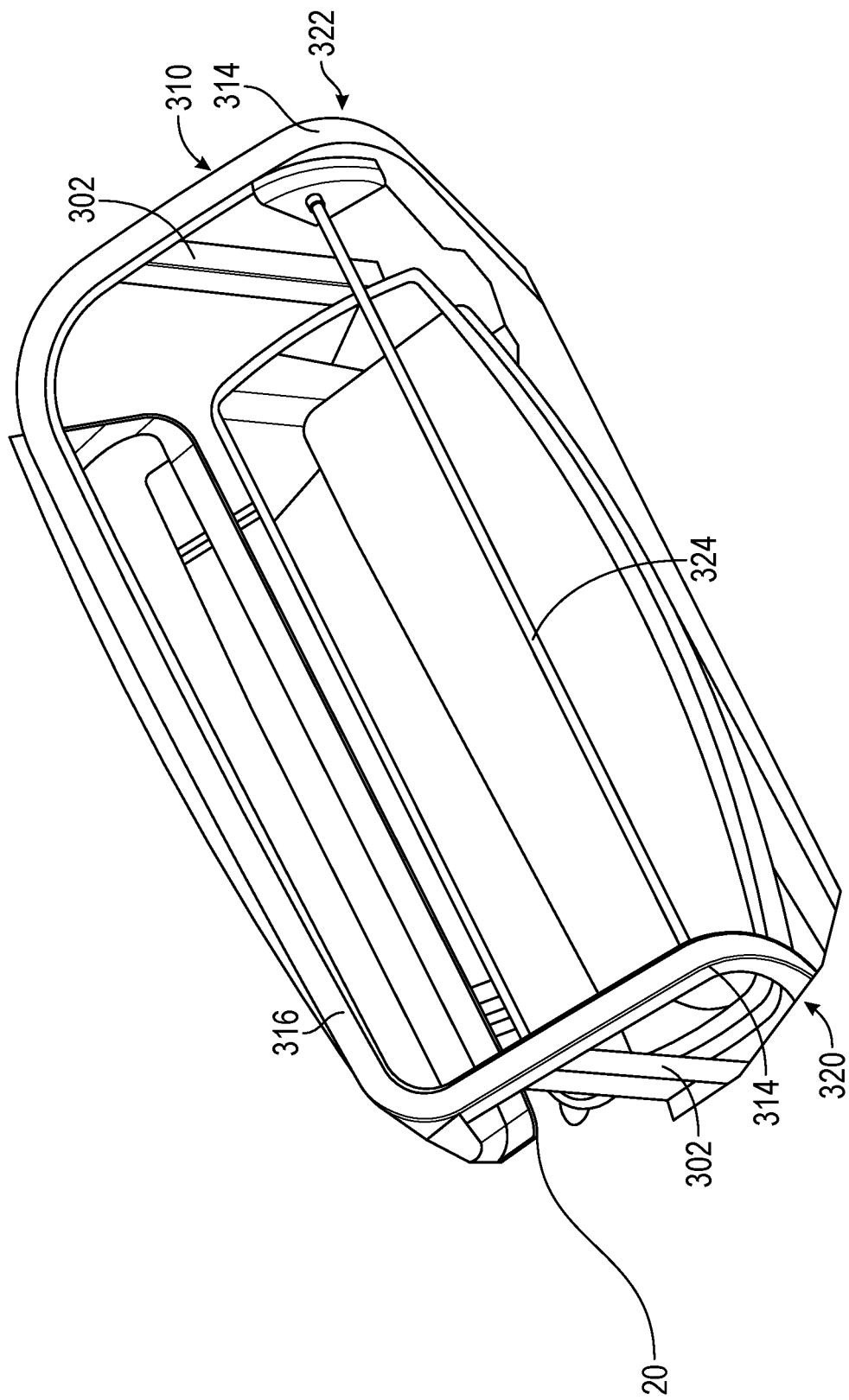
FIG. 7 is a front, top perspective view of the user interface and the railing of FIG. 6 with the user interface in the maintenance position.
Figure 8:
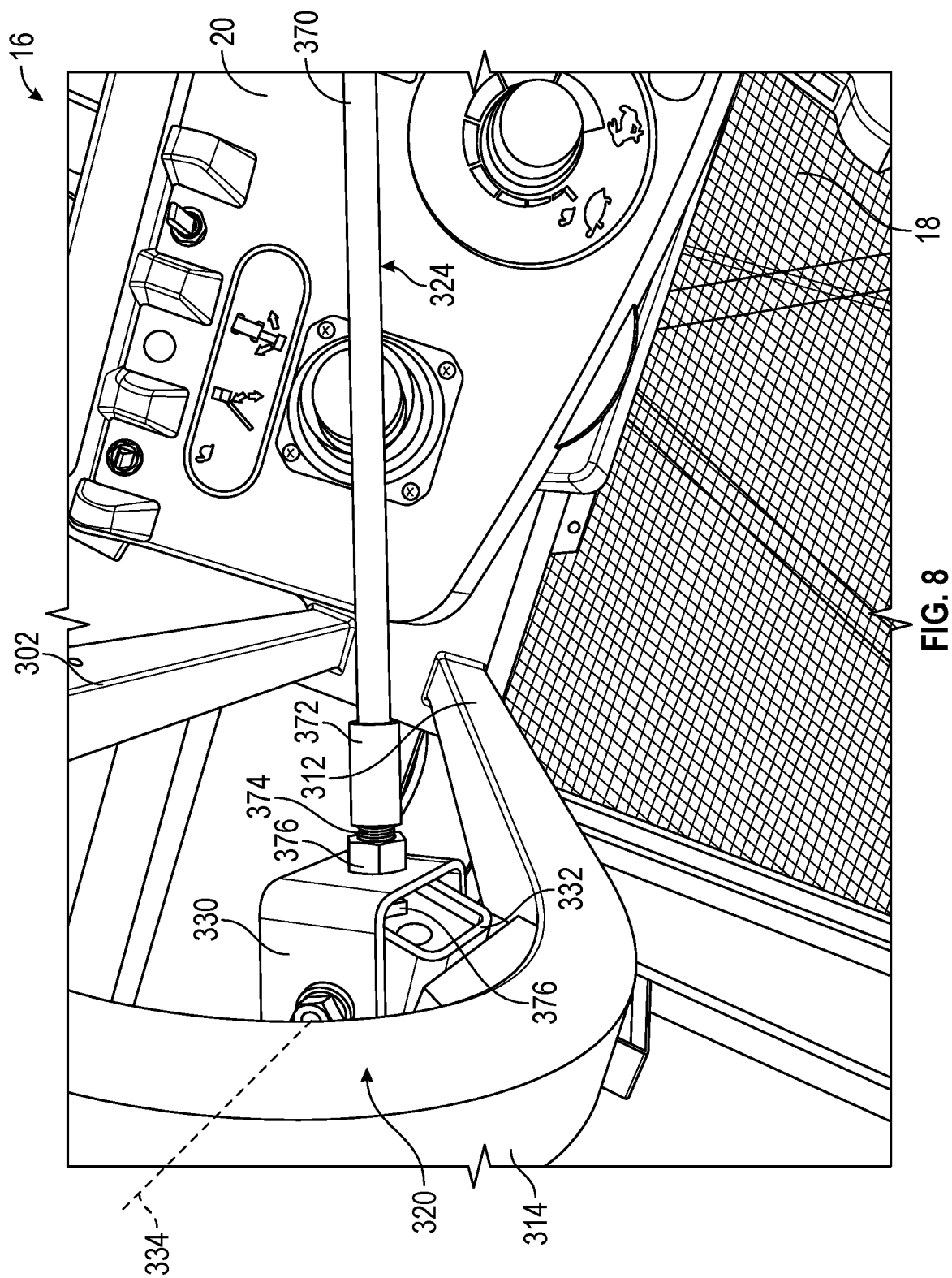
FIG. 8 is a top perspective view of a user contact sensor coupled to the platform of FIG. 4.
Figure 9:
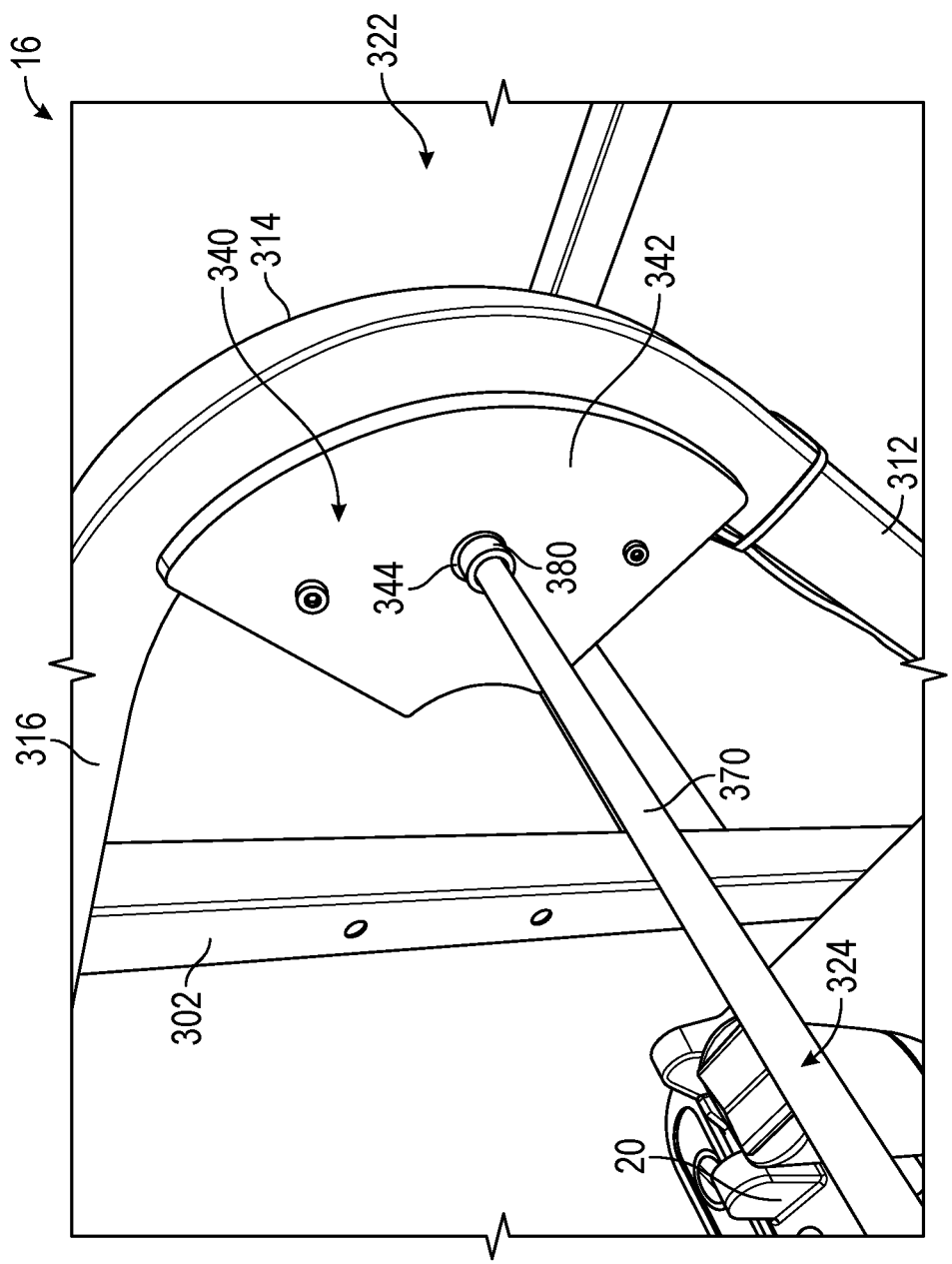
FIG. 9 is a left perspective view of the user contact sensor of FIG. 8 and the platform of FIG. 4.
Figure 10:
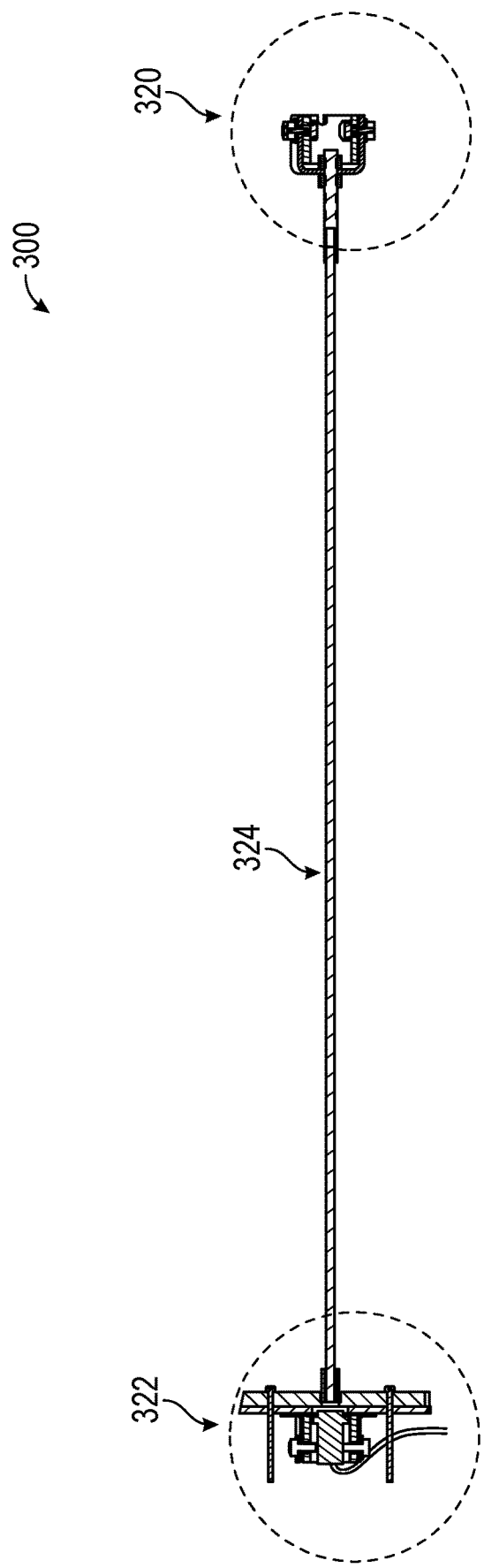
FIG. 10 is a top section view of the user contact sensor of FIG. 8.
Figure 11:
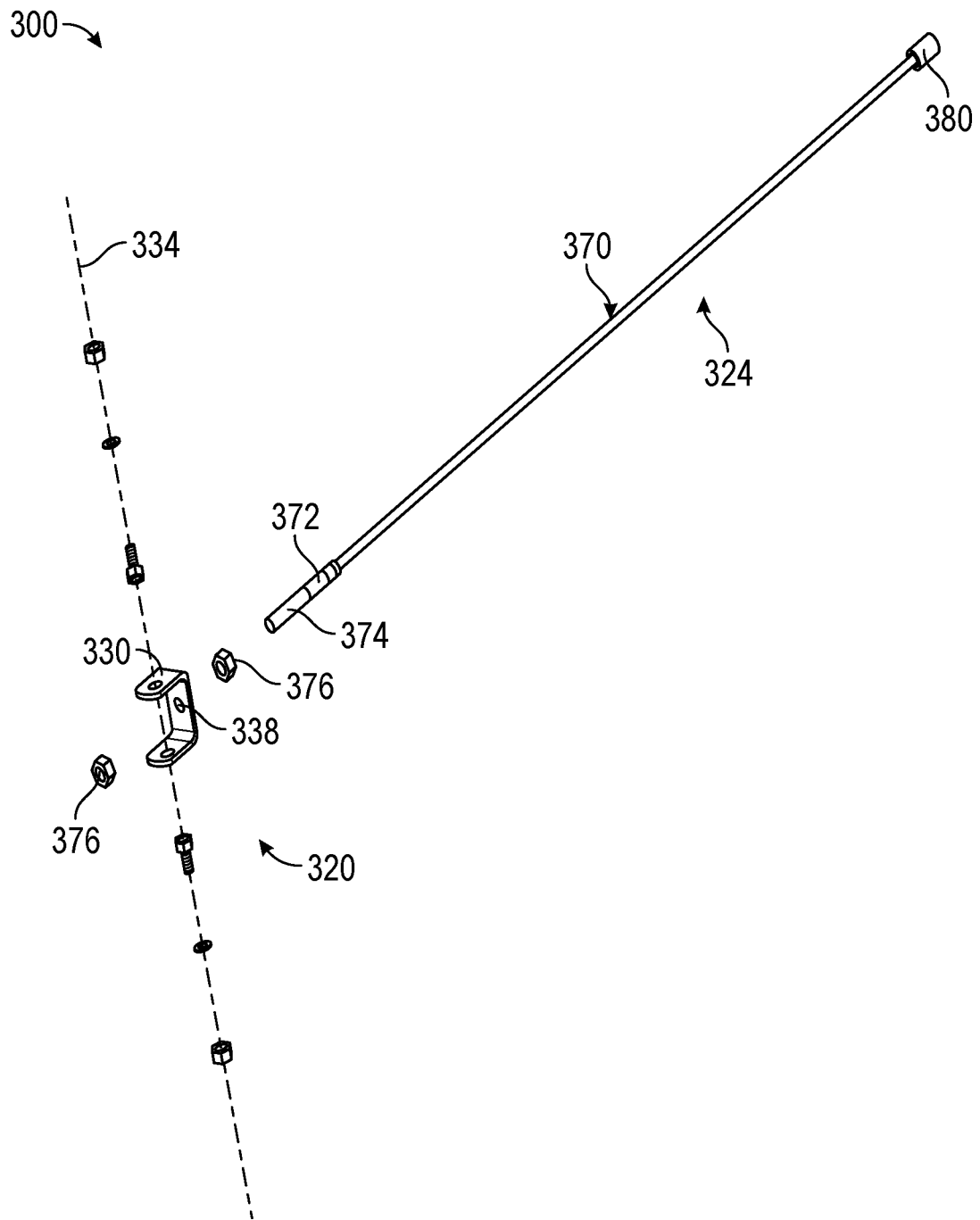
FIGS. 11 and 12 are exploded views of the user contact sensor of FIG. 8.
Figure 12:
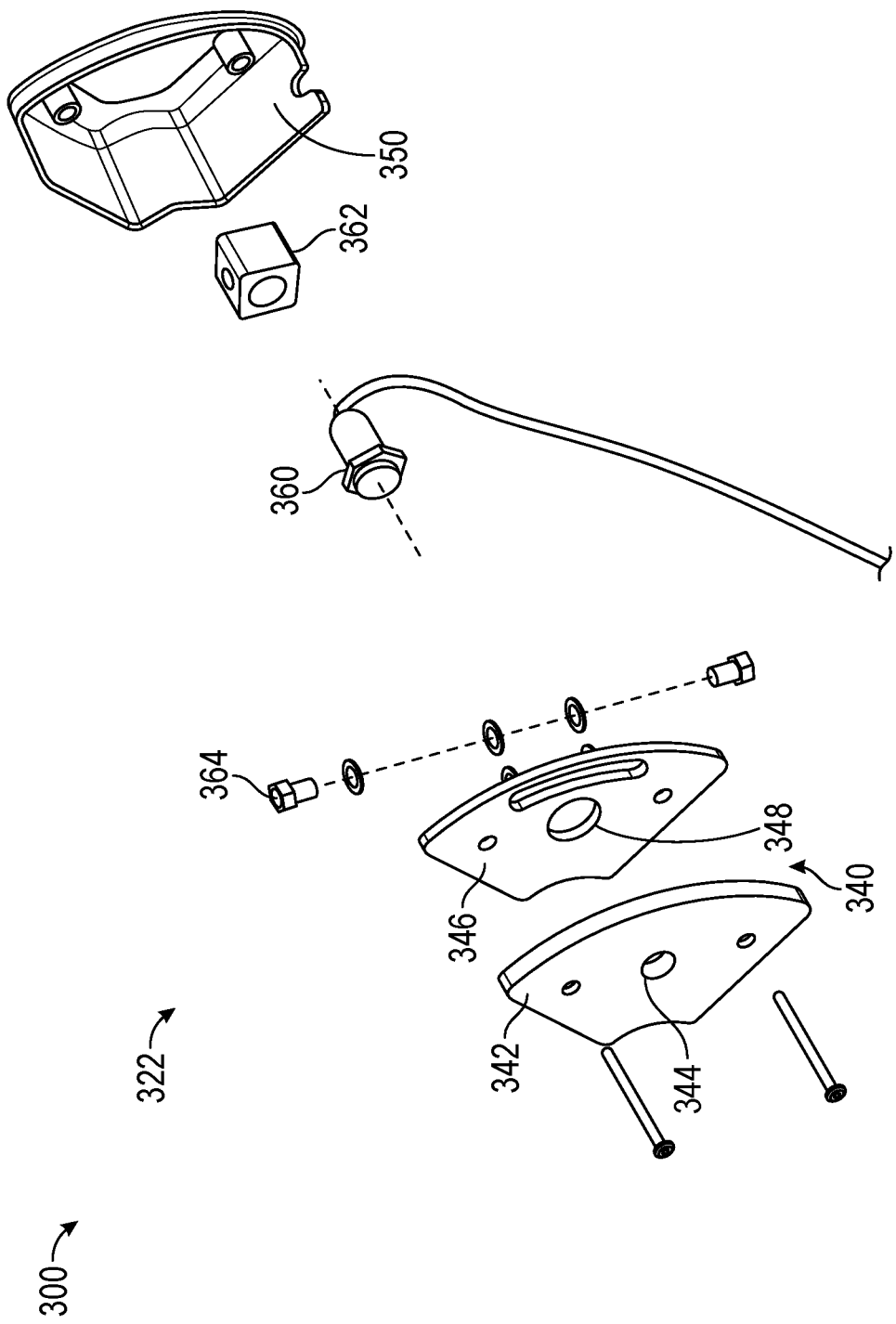
Figure 14:
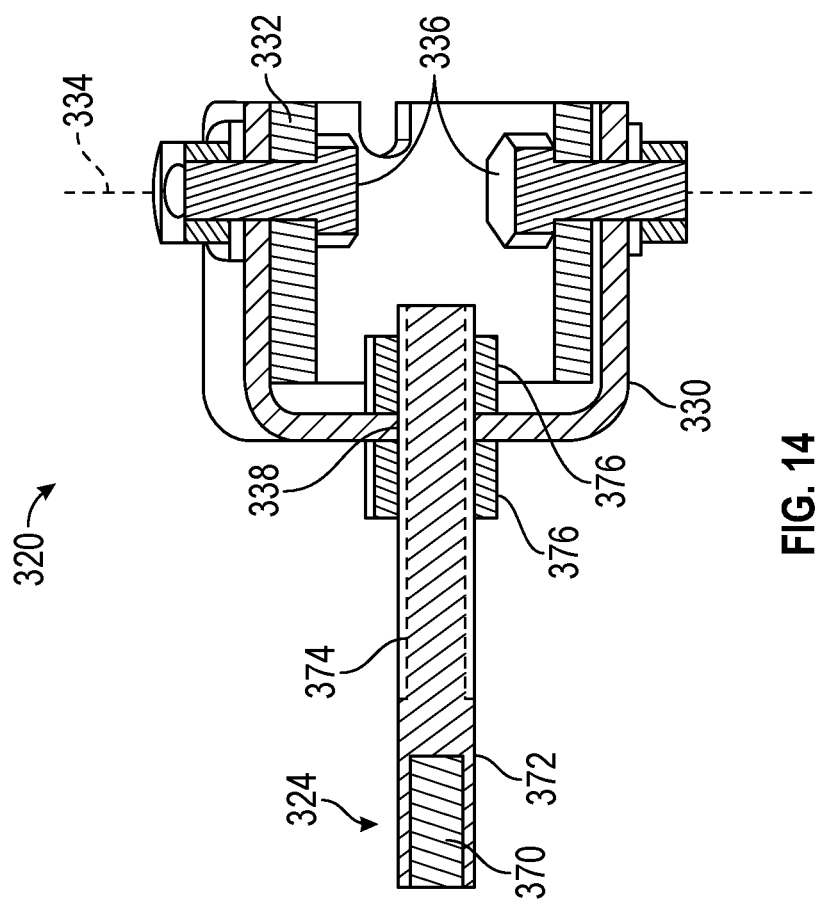
FIGS. 13 and 14 are section views of the user contact sensor of FIG. 8.

Referring to FIG. 5, the lift device 10 includes a control system 200. The control system 200 includes the controller 38. The controller 38 includes a processor 202 and a memory device, shown as memory 204. The memory 204 may contain one or more programs or instructions for execution by the processor 202.

As shown in FIG. 5, the controller 38 is operatively coupled to (e.g., in communication with) the motor 26, the platform rotator 30, the turntable motor 44, the actuators (e.g., the actuator 34a, the actuator 34b, etc.), the extension actuator 35, and the motors 52. The controller 38 is operatively coupled to the user interface 20 and the user interface 21. The controller 38 is operatively coupled to an indicator, shown as alarm 210. The alarm 210 may provide an indication, alert, or warning to a user when activated. The indication from the alarm 210 may be visual, auditory, or another type of indication (e.g., vibrational haptic feedback). By way of example, the alarm 210 may provide an auditory indication (e.g., a siren) or a visual indication (e.g., a flashing light) to a user. The controller 38 is operatively coupled to a sensor assembly (e.g., a barrier sensor, an operator position sensor, a user position sensor, a user contact sensor, an operator contact sensor, etc.), shown as user contact sensor 300. As described herein, the user contact sensor 300 is configured to provide an indication (e.g., a signal) to the controller 38 in response to contact with a user. The user contact sensor 300 may be positioned such that a user positioned in front of the user contact sensor 300 engages the user contact sensor 300 when a portion of a user's upper body (e.g., a torso, a stomach, a shoulder, etc.) moves toward and/or above the user interface 20. Although FIG. 5 only illustrates operative coupling between the controller 38 and certain components of the lift device 10, it should be understood that other components may be in communication with the controller 38 as well. By way of example, the batteries 64 may be operatively coupled to the controller 38.

The controller 38 may be configured to receive information (e.g., user instructions, sensor signals, etc.) from one or more components of the lift device 10. By way of example, the controller 38 may receive user inputs or commands from the user interface 20 and/or the user interface 21. By way of another example, the controller 38 may receive an input from the user contact sensor 300 (e.g., a signal indicating that a user has applied a force on the user contact sensor 300).

The controller 38 may be configured to provide information (e.g., commands, indication, etc.) to one or more components of the lift device 10. By way of example, the controller 38 may send commands (e.g., signals) that control the outputs (e.g., movement) of the motor 26, the actuators 34, the extension actuator 35, the motors 52, and/or any other actuators of the lift device 10. By way of another example, the controller 38 may provide a command to the alarm 210 that causes the alarm 210 to activate. By way of another example, the controller 38 may provide commands that cause the user interface 20 and/or the user interface 21 to provide (e.g., display) information to a user.

User Contact Sensor

Referring to FIGS. 4 and 6-9, the user contact sensor 300 is coupled to the rails 22. Specifically, the rails 22 include a pair of frame members, shown as vertical rails 302, that extend vertically upward from the deck 18. The vertical rails 302 are positioned on opposite sides of the user interface 20 such that the user interface 22 extends laterally between the vertical rails 302. A rail, shown as cage 310, is fixedly coupled to the vertical rails 302 and extends around the user interface 20. Specifically, the cage 310 extends laterally between the vertical rails 302, longitudinally forward of the vertical rails 302, and longitudinally rearward of the vertical rails 302. The cage 310 includes a pair of inclined portions 312, each extending longitudinally forward and vertically upward from a middle portion of one of the vertical rails 302. The cage 310 further includes a pair of curved portions 314, each coupled to an upper end of one of the inclined portions 312. The curved portions 314 each extend upward and longitudinally rearward from the corresponding inclined portion 312. A u-shaped horizontal portion 316 is coupled to both of the curved portions 314. The horizontal portion 316 extends longitudinally rearward from the curved portions 314 and laterally between the curved portions 314. The horizontal portion 316 is coupled to the top end of each vertical rail 302. The curved portions 314 and the horizontal portion 316 both extend above the user interface 20.

The user contact sensor 300 is an assembly including a first end portion or hinge, shown as pivot portion 320, a second end portion, shown as sensing portion 322, and central portion or rod, shown as bar assembly 324. The pivot portion 320 is directly coupled to the curved portion 314 of the cage 310 on the left side of the user interface 20. The sensing portion 322 is directly coupled to the curved portion 314 of the cage 310 on the right side of the user interface 20. The bar assembly 324 is coupled to the pivot portion 320 and extends laterally from the pivot portion 320 to the sensing portion 322. Accordingly, the user contact sensor 300 is positioned above and longitudinally forward of the user interface 20. In other embodiments, the user contact sensor 300 is mirrored such that the sensing portion 322 is positioned to the left of the user interface 20 and the pivot portion 320 is positioned to the right of the user interface.

Referring to FIGS. 8, 10, 11, and 14, the pivot portion 320 is shown according to an exemplary embodiment. The pivot portion 320 includes a first bracket, first hinge portion, or pivoting portion, shown as pivoting clevis 330, and a second bracket, second hinge portion, or fixed portion, shown as fixed clevis 332. The fixed clevis 332 is fixedly coupled to the curved portion 314 to the left of the user interface 20. The pivoting clevis 330 is pivotally coupled to the fixed clevis 332 such that the pivoting clevis 330 pivots about an axis 334. Specifically, a pair of fasteners, shown as bolts 336, extend through corresponding pivot apertures defined by the pivoting clevis 330 and the fixed clevis 332 to pivotally couple the pivoting clevis 330 to the fixed clevis 332. In some embodiments, the axis 334 is skewed in a longitudinal direction relative to a vertical axis such that the bar assembly 334 moves downward when moved in a longitudinally rearward direction. In other embodiments, the axis 334 is substantially vertical. The pivoting clevis 330 further defines an aperture or passage (e.g., a rod aperture), shown as bar aperture 338, that extends perpendicular to the axis 334. The bar aperture 338 receives the bar assembly 324 therethrough.

Referring to FIGS. 9, 10, 12, and 13, the sensing portion 322 is shown according to an exemplary embodiment. The sensing portion 322 includes a housing 340. The housing 340 includes a first member or face plate portion, shown as outer plate 342, and defines a surface of the housing 340 that faces the pivot portion 320. The outer plate 342 defines a laterally-extending aperture or passage, shown as end aperture 344. The end aperture 344 is sized to receive an end of the bar assembly 324. The outer plate 342 is directly coupled to a second member or portion of the housing 340, shown as inner plate 346. The inner plate 346 and the outer plate 342 may extend substantially parallel to one another. The inner plate 346 defines a laterally-extending aperture or passage, shown as sensor aperture 348. The sensor aperture 348 may be substantially aligned with the end aperture 344. The housing 348 further includes a third member, shown as back shell 350. The back shell 350 is coupled to the inner plate 346 and the outer plate 342. An inner volume of the housing 350 is defined between the inner plate 346 and the back shell 350.

Figure 13:
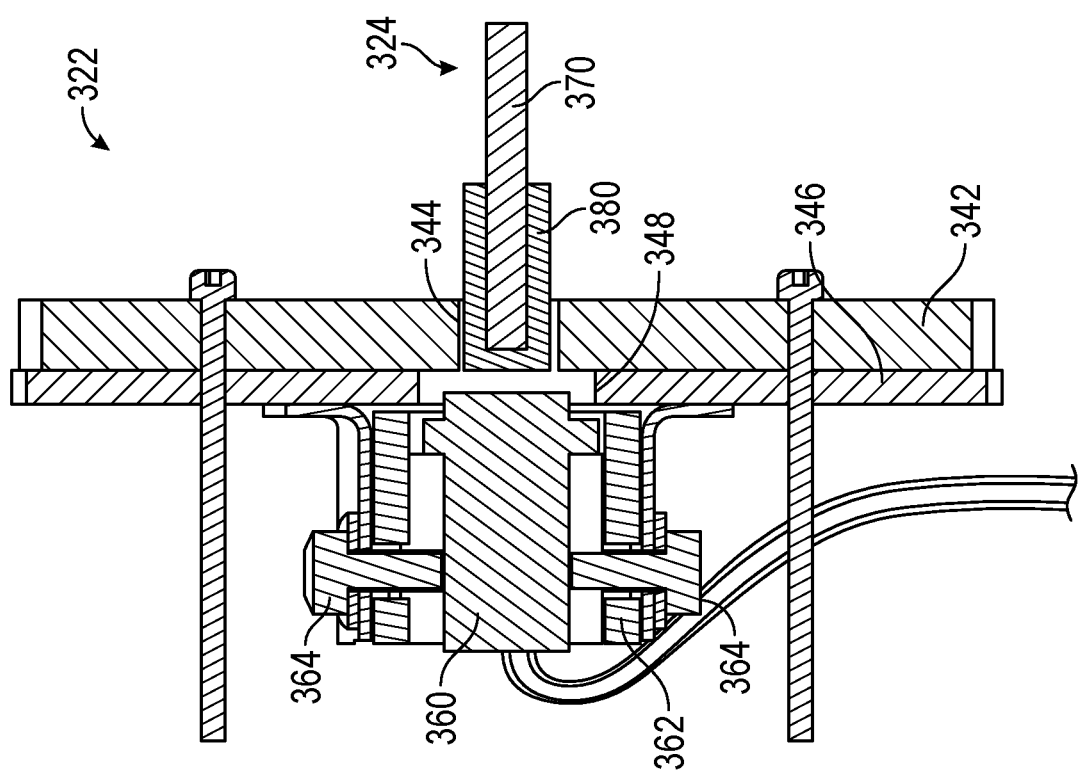

The inner volume of the housing 350 receives a sensor 360 extending into the sensor aperture 348. The sensor 360 may be substantially aligned with the end aperture 344 and the sensor aperture 348. The sensor 360 is received within a laterally-extending passage or aperture defined by a boss, shown as sensor block 362. The sensor block 362 is coupled to the inner plate 346. In some embodiments, the lateral position of the sensor 360 relative to the sensor block 362 is adjustable (e.g., the sensor 360 is selectively slidably coupled to the block 360 of the housing 360). As shown in FIG. 13, the sensing portion 322 includes a pair of fasteners, shown as sensor bolts 364, that are in threaded engagement with the sensor block 362. The sensor bolts 364 may be loosened to permit free lateral movement of the sensor 360. When tightened, the sensor bolts 364 engage the sensor 360, limiting (e.g., preventing) lateral movement of the sensor 360.

Referring to FIGS. 8-11 and 13-17, the bar assembly 324 is shown according to an exemplary embodiment. The bar assembly 324 includes a first portion, central portion, or resilient member, shown as bar 370. The bar 370 is relatively long and thin and makes up the majority of the length of the bar assembly 324. In some embodiments, the bar 370 is made from a resilient material that is flexible but returns to an original shape after an applied force on the bar 370 is released. In one embodiment, the bar 370 may be made from fiberglass. In other embodiments, the bar 370 is made from another resilient material, such as plastic.

Coupled to a first end of the bar 370 is a first end portion of the bar assembly 324, shown as threaded end 372. The threaded end 372 is fixedly coupled to the bar 370. By way of example, the threaded end 372 may define a recess that receives an end of the bar 370, and the bar 370 may be fixed in place using an adhesive (e.g., epoxy). The threaded end 372 includes exterior threads, shown as threaded portion 374. The threaded portion 374 extends through the bar aperture 338 defined by the pivot portion 320. A pair of fasteners, shown as nuts 376, each engage the threaded portion 374. Specifically, each nut 376 is positioned on and tightened against an opposing side of the pivoting clevis 330, holding the threaded end 372 in place relative to the pivoting clevis 330. The lateral position of the threaded end 372 relative to the pivoting clevis 330 may be adjusted (e.g., to adjust the position of the opposing end relative to the sensing portion 322) by loosening the nuts 376, moving the nuts 376 to a different position along the threaded portion 374, and retightening the nuts 376. In other embodiments, the bar aperture 338 is in threaded engagement with the threaded portion 374. In such embodiments, one or both of the nuts 376 may be omitted.

Coupled to a second end of the bar 370 opposite the first end is a second end portion of the bar assembly 324, shown as sensor end 380. The sensor end 380 is fixedly coupled to the bar 370. By way of example, the sensor end 380 may define a recess that receives an end of the bar 370, and the bar 370 may be fixed in place using an adhesive. The sensor end 380 is sized to be received within the end aperture 344. The exterior surface of the sensor end 380 may be substantially cylindrical. In other embodiments, the sensor end 380 formed as part of the bar 370 (i.e., the bar 370 and the sensor end 380 are not separate pieces).

The sensor 360 is operatively coupled to the controller 38 and configured to provide a signal indicating at least one of (a) whether or not the sensor end 380 is present within the end aperture 344 or (b) that the sensor end 380 has entered or exited the end aperture 344. By way of example, the sensor 360 may indicate that the sensor end 380 has exited the end aperture 344 when the sensor 360 detects the presence of the sensor end 380 at a first time and subsequently does not detect the presence of the sensor end 380. The sensor 360 may be or include any type of sensor that is capable of providing this information.

In some embodiments, the sensor 360 is a proximity sensor that is configured to detect a proximity of an object within the end aperture 344. In such an embodiment, the sensor 360 may determine that the sensor end 380 is present when the sensor 360 detects an object within a threshold distance of the sensor 360. In such embodiments, the nuts 376 and/or the fasteners 364 may be adjusted to adjust the lateral positions of the sensor 360 and/or the bar assembly 324, thereby varying the distance between the sensor end 380 and the sensor 360. This adjustment may be performed such that the sensor end 380 is positioned within the threshold distance of the sensor 360 when the sensor end 380 is received within the end aperture 344. In some embodiments that utilize a proximity sensor, the sensor 360 is spaced or separated from the sensor end 380 such that the sensor end 380 does not engage the sensor 360.

In some embodiments, the sensor 360 is a proximity sensor that is configured to sense the presence of metals (e.g., an inductive proximity sensor). Such a proximity sensor may be configured to differentiate or distinguish between a metal or metallic material (e.g., steel, brass, aluminum, copper, etc.) and a non-metal or non-metallic material (e.g., plastic, fiberglass, wood, etc.). By way of example, the sensor 360 may provide a first signal in response to the presence of a metal within the threshold distance and provide a second, different signal in response to the presence of a non-metal within the threshold distance. In embodiments that utilize a proximity sensor that is configured to sense metals, the sensor end 380 may be made of a metal, and the portions of the housing 350 that are in close proximity to the sensor 360 (e.g., the outer plate 340 and the inner plate 346) may be made of a non-metal. Such a configuration may facilitate avoiding falsely detecting the presence of the sensor end 380.

In other embodiments, the sensor 360 utilizes a different type of sensor. In some embodiments, the sensor 360 utilizes a different type of proximity sensor. By way of example, the sensor 360 may include an infrared proximity sensor, an ultrasonic proximity sensor, a capacitive proximity sensor, a laser rangefinder, or another type of proximity sensor. In some embodiments, a permanent magnet is coupled to the sensor end 380, and a sensor 360 (e.g., a hall effect sensor) detects the magnetic field produced by the permanent magnet. In some embodiments, the sensor 360 includes a break beam sensor that detects when a beam of light is interrupted by the sensor end 380. Such a sensor may be positioned such that the sensor end 380 interrupts the beam when the sensor end 380 is received within the end aperture 344. In some embodiments, the sensor 360 includes two more contacts that engage the sensor end 380, passing current through the sensor 380. Such as sensor may be positioned such that the sensor end 380 engages the contacts to form a closed circuit within the sensor end 380 is received within the end aperture 344, and the controller 348 whether or not the sensor end 380 is present based on a measured current passing through the contacts.

Figure 18:
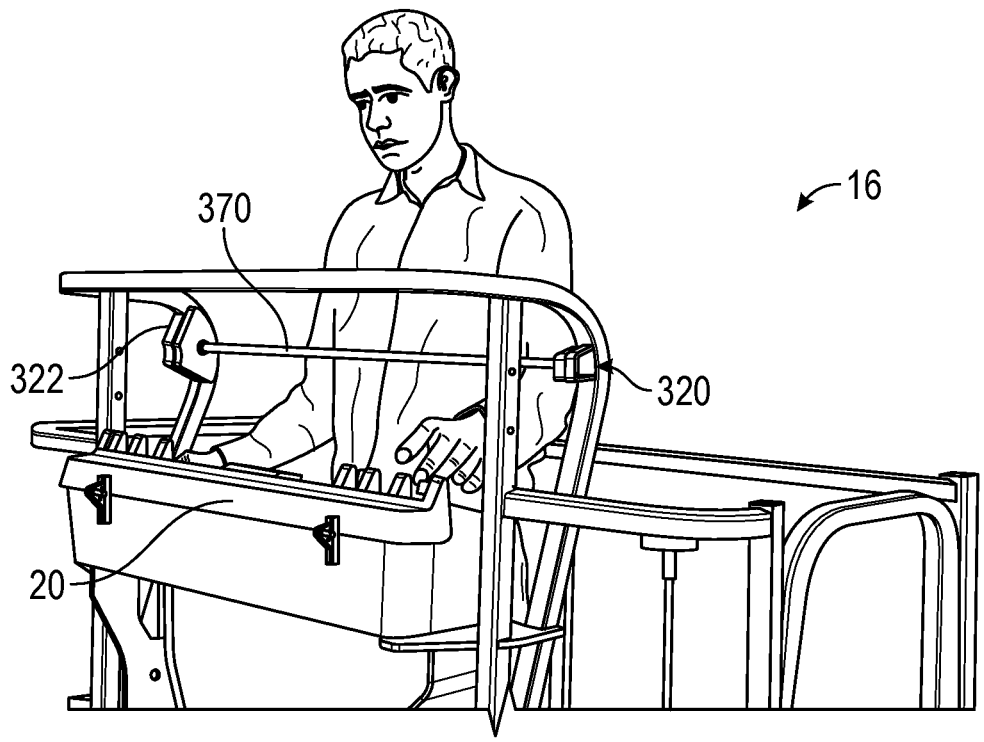
FIGS. 18, 19, 20, and 21 are rear perspective views illustrating a first operating sequence of the platform of FIG. 4 and the user contact sensor of FIG. 8.
Figure 22:
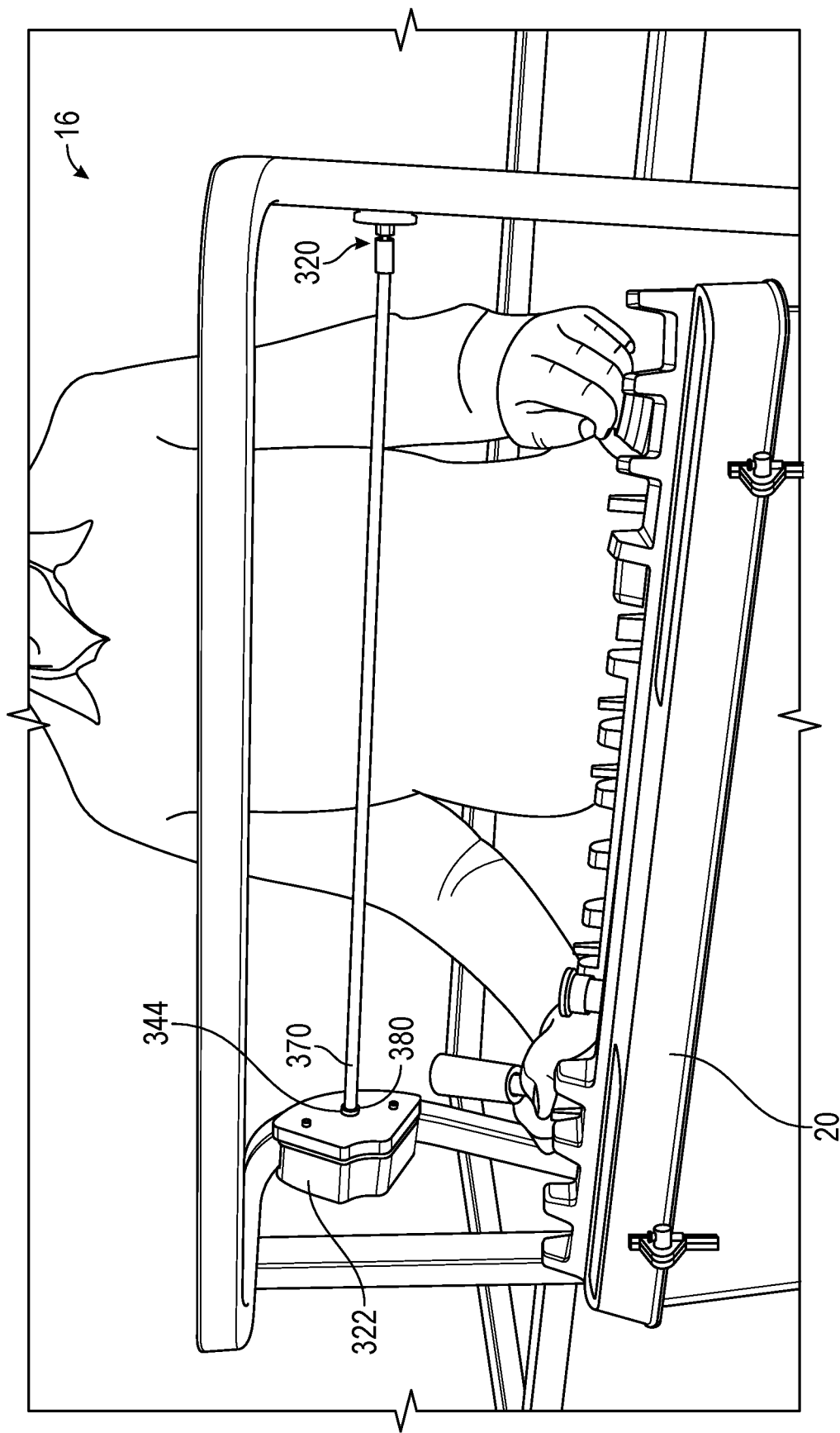
FIGS. 22, 23, and 24 are rear perspective views illustrating a second operating sequence of the platform of FIG. 4 and the user contact sensor of FIG. 8.
Figure 23:
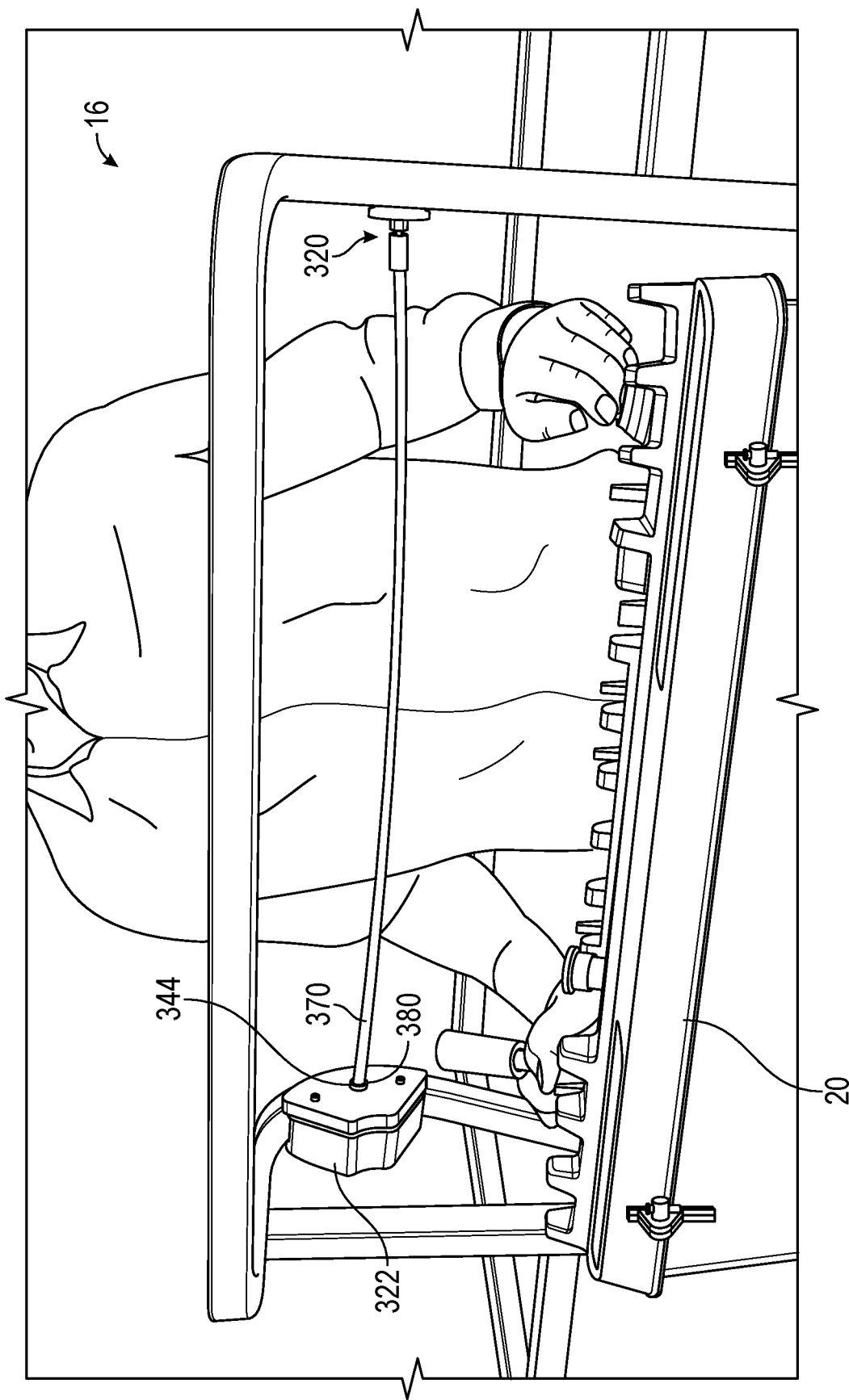
Figure 24:
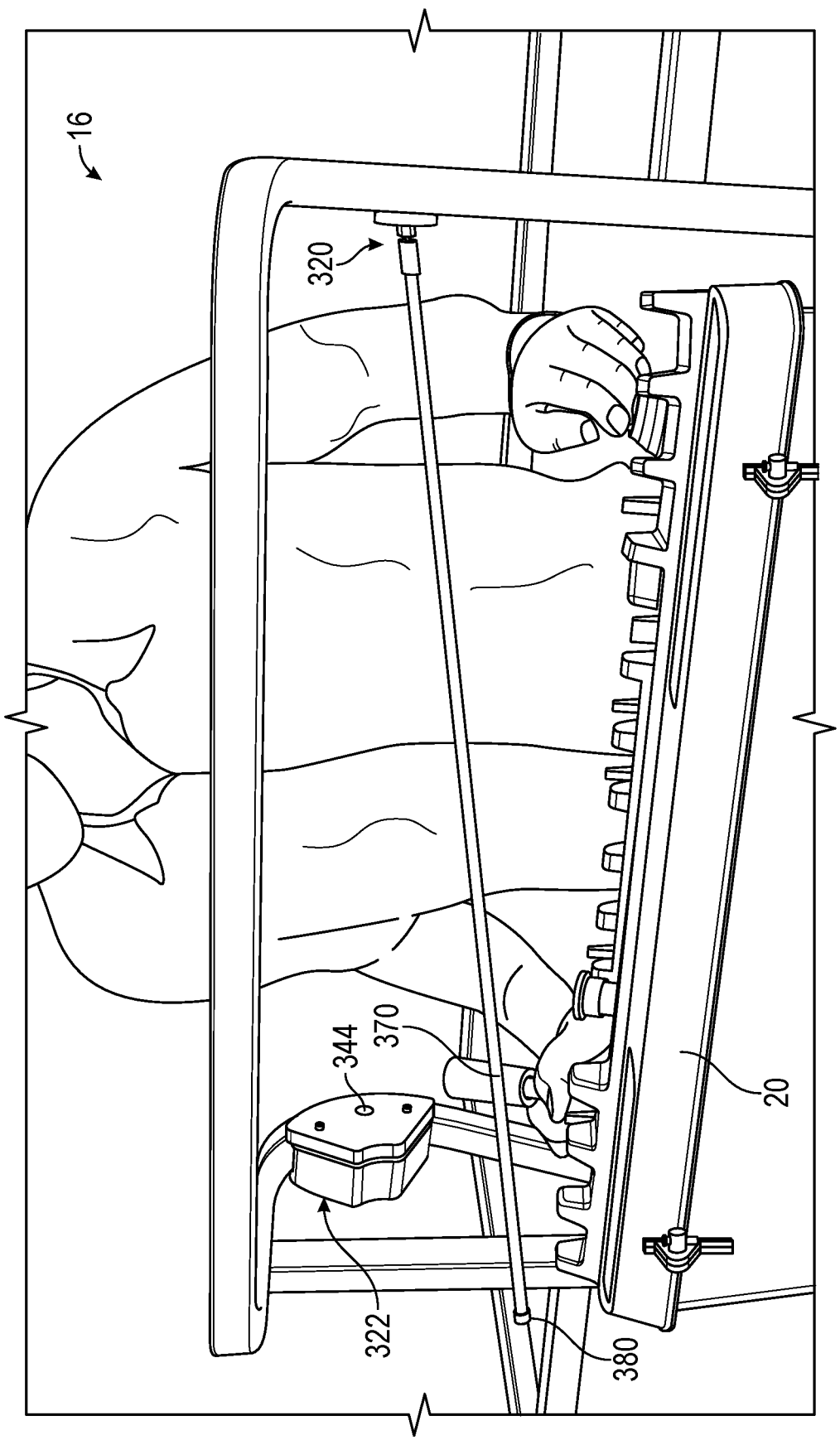

Operation of the user contact sensor 300 is shown from a first perspective in FIGS. 18-21 and from a second perspective in FIGS. 22-24. In operation, the user contact sensor 300 is configured such that the sensor end 380 is normally positioned within the end aperture 344. This configuration is shown in FIGS. 18 and 22. The rails 22 hold the pivot portion 320 and the sensing portion 322 at a fixed distance relative to one another, and the bar is sized such that the sensor end 380 engages the outer plate 342 to prevent the sensor end 380 from leaving the end aperture 344 due to minor forces (e.g., due to vibration of the lift device 10, due to a user brushing against the bar 370, etc.). While the sensor end 380 remains within the end aperture 344, the sensor 360 provides a first signal to the controller 38, and the controller 38 permits standard control of the lift device 10.

As the user operates the lift device 10, they generally stand in front of the user interface 20 and face toward the user interface 20, as shown in FIGS. 18 and 22. In some situations, the lift assembly 14, the turntable 70, and/or the motors 52 move the platform 16 in proximity to an obstacle (e.g., a tree, a portion of a structure such as a support beam, etc.). In some such situations, the user is positioned between the user interface 20 and the obstacle. As the lift assembly 14 moves the platform 16, the distance between the user interface 20 and the obstacle may decrease, limiting the freedom of movement of the operator. In some such cases, it may be difficult for the user to access the controls of the user interface 20 to move the platform 16 away from the obstacle.

Figure 19:
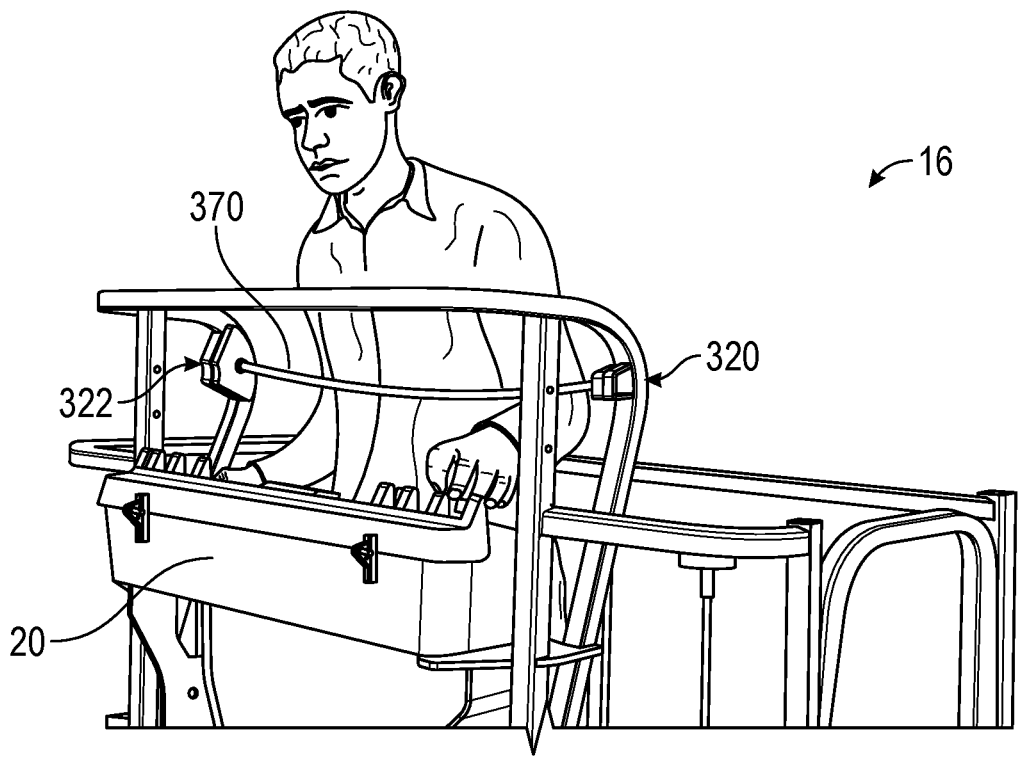

If the obstacle pushes the user toward the user interface 20, the user comes into contact with the bar 370 of the user contact sensor 300. In some embodiments, the height of the bar 370 is selected such that the upper body (e.g., the stomach, the chest, the arms, the shoulders, etc.) of the user comes into contact with the bar 370. As shown in FIGS. 19 and 23, the user presses against the bar 370, applying a longitudinally-rearward force near the center of the bar 370, and the resilient material of the bar 370 begins to bow. If the user were to release the force on the bar 370, the resilient material of the bar 370 would return to the original, straight shape, and the sensor end 380 would remain in the end aperture 344 (e.g., the bar 370 elastically deforms in response to the force on the bar 370). Accordingly, the resilient nature of the bar 370 causes the bar 370 to apply a biasing force that resists (a) bending of the bar 370 and (b) removal of the sensor end 380 from the end aperture 344. If the user's force on the bar 370 is released before the bow 370 is bent to a threshold position, the biasing force of the bar 370 returns the bar 370 and the sensor end 380 to the original position.

Figure 20:
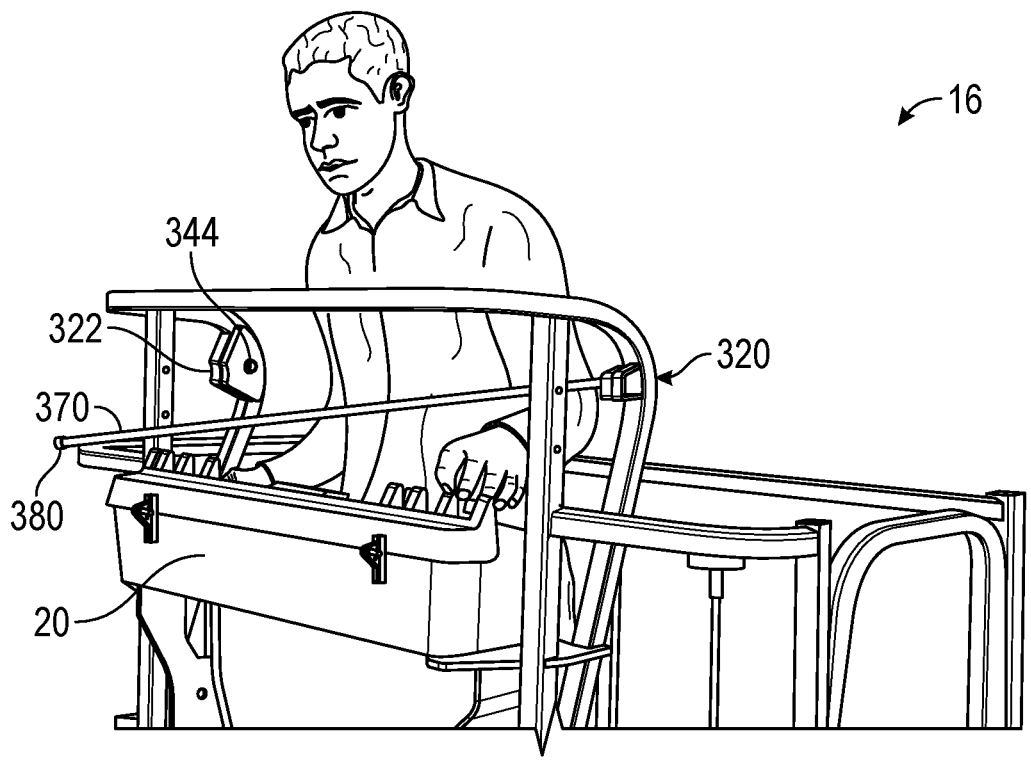
Figure 21:
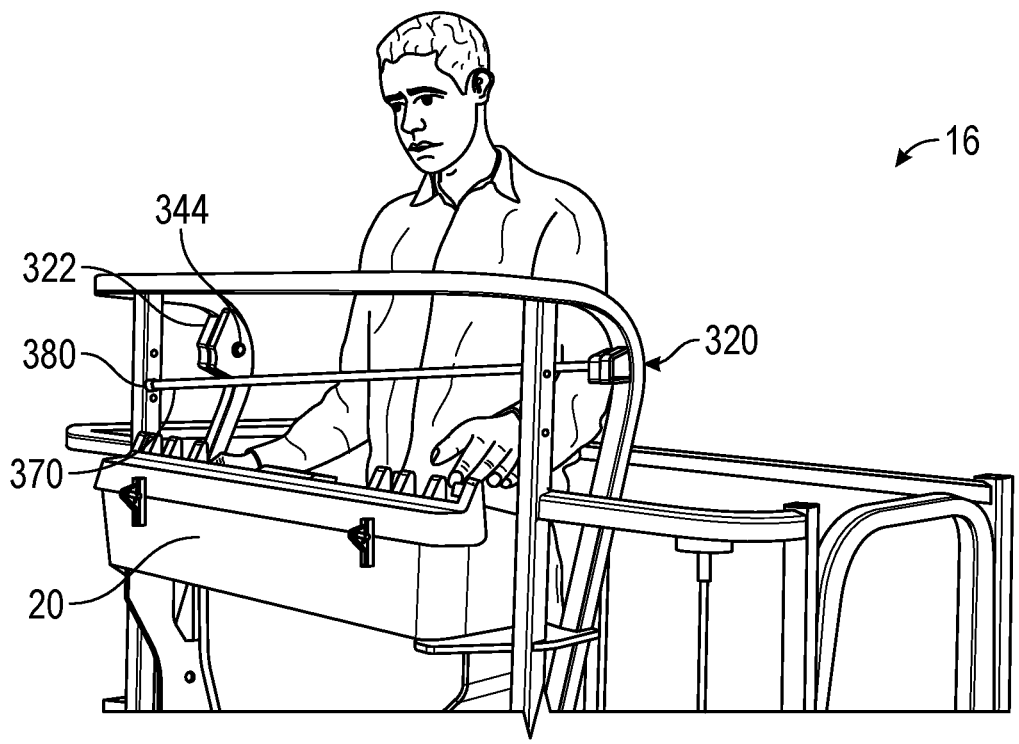

As shown in FIGS. 20 and 24, if the user continues to apply a force on the bar 370 (e.g., because they are being pushed rearward by the object as the lift assembly 14 extends), the bending of the bar 370 becomes significant enough (e.g., exceeds a threshold deflection, is bent beyond the threshold position, etc.) for the sensor end 380 to exit the end aperture 344. After the sensor end 380 exits the end aperture 344, the pivot portion 320 permits the bar 370 to rotate freely away from the user, longitudinally rearward and/or downward.

In response to the sensor end 380 exiting the end aperture 344, the sensor 360 provides a second signal to the controller 38. The second signal indicates that the sensor end 380 has exited the end aperture 344. In response to receiving the second signal, the controller 38 may be configured to perform one or more actions to stop or reverse one or more recent movements of the lift device 10. The controller 38 may additionally or alternatively activate the alarm 210 in response to receiving the second signal. By way of example, the controller 38 may stop movement of all of the actuators of the lift device 10 (e.g., the actuators 34, the motors 32, etc.). By taking this action, the controller 38 may ensure that the platform 16 does not move further relative to the obstacle.

In some embodiments, in response to receiving the second signal, the controller 38 is configured to reverse the movements of one or more systems of the lift device 10 that occurred immediately before the second signal was received. One such example of this is illustrated in FIGS. 18-21. In FIGS. 18 and 19, the platform 16 rises. After the user contact sensor 300 is activated in FIG. 20, the platform 16 is lowered in FIG. 21. By way of another example, if the lift assembly 14 raised the platform 16 and the motors 52 moved the base assembly 12 in a forward direction immediately prior to the receipt of the second signal, the controller 38 may control the lift assembly 14 to lower the platform 16 and/or control the motors 52 to move the base assembly 12 in a reverse direction. In order to identify the correct reverse movements to perform, the controller 38 may retain a history of all of the movements of the lift device 10 (e.g., as measured by sensors or as instructed by the controller 38) and the time at which they occurred. The controller 38 may determine what reverse movements to perform based on the history.

Referring to FIGS. 25-30, an alternative embodiment of the platform 16 and the user contact sensor 300 is shown according to an exemplary embodiment. The platform 16 and the user contact sensor 300 may be substantially similar to the platform 16 and the user contact sensor 300 as previously described, except as otherwise specified.

Figure 25:
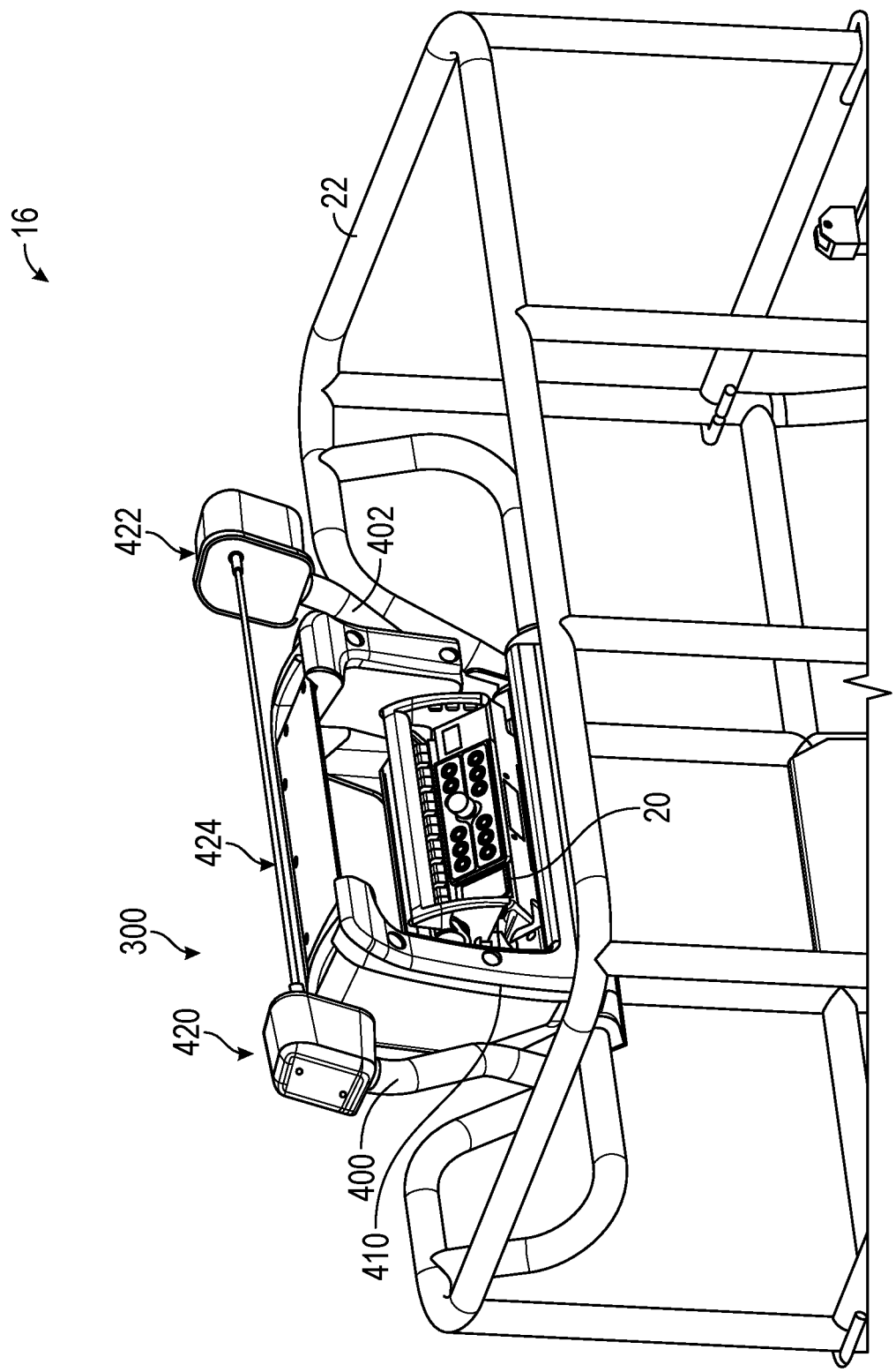
FIG. 25 is a perspective view of a platform and a user contact sensor according to another embodiment.
Figure 26:
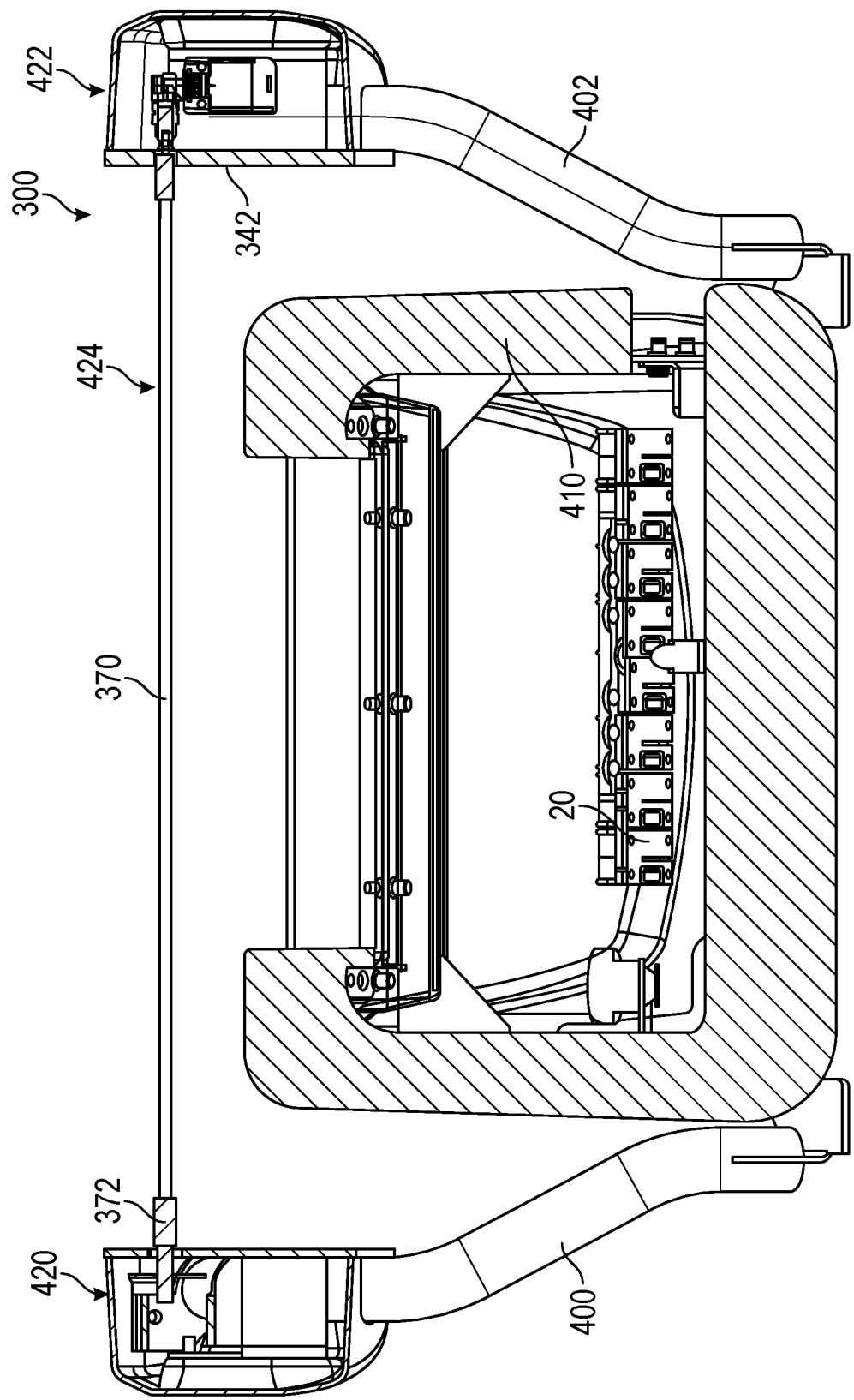
FIG. 26 is a front section view of the platform and the user contact sensor of FIG. 25.
Figure 27:
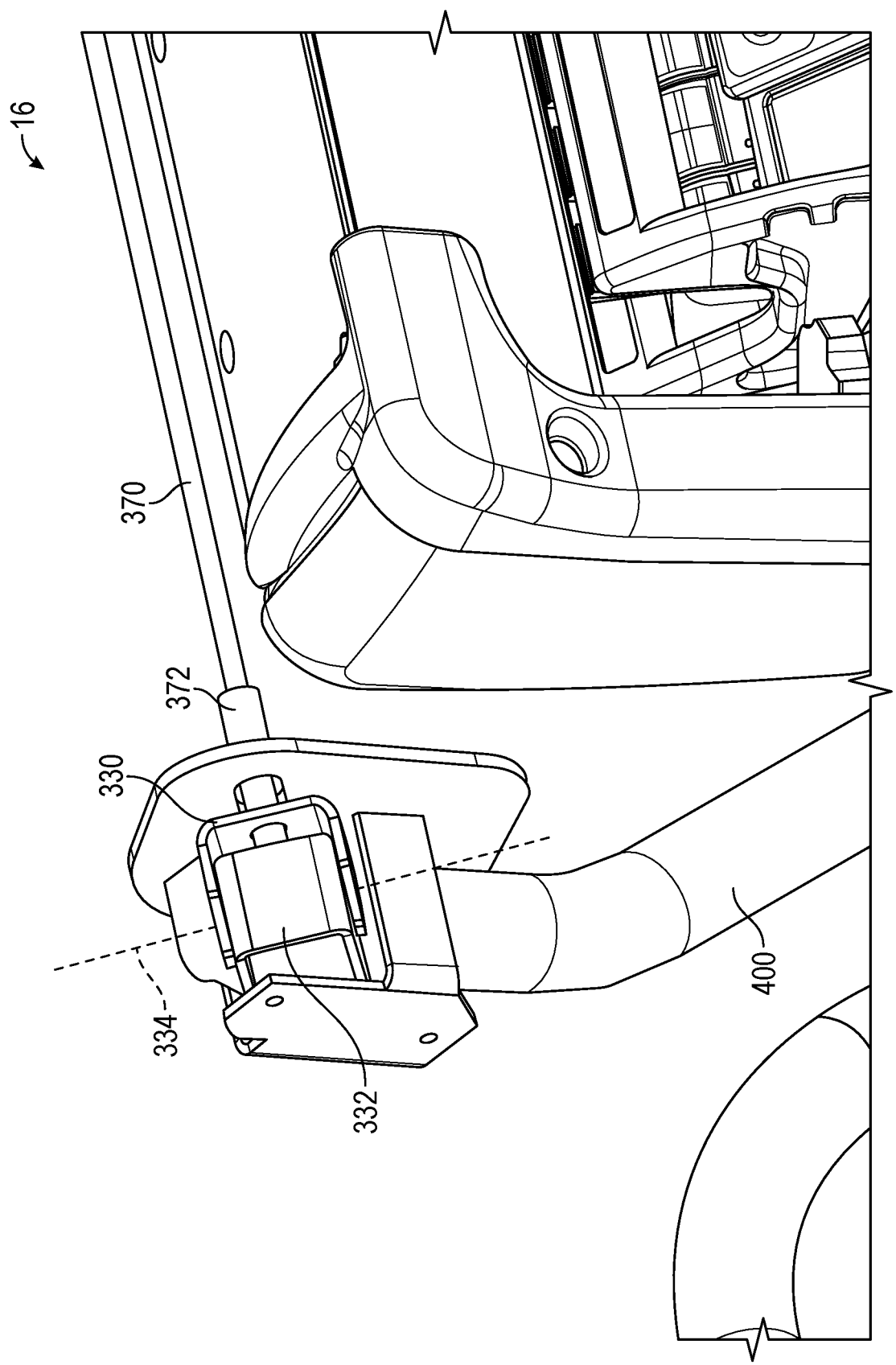
FIGS. 27 and 28 are perspective views of the platform and the user contact sensor of FIG. 25.

The platform 16 of FIG. 25 includes a pair of rails, shown as upright rails 400 and 402. The upright rails 400 and 402 extend generally vertically. The user interface 20 is contained within a cover, shown as housing 410, that is fixedly coupled to the upright rails 400 and 402. The upright rail 400 is positioned laterally to the left of the user interface 20 and the housing 410. The upright rail 402 is positioned laterally to the right of the user interface 20 and the housing 410. Accordingly, the user interface 20 and the housing 410 extend laterally between the upright rails 400 and 402.

The user contact sensor 300 of FIG. 25 includes a pivot portion 420, a sensing portion 422, and a bar assembly 424 that may be substantially similar to the pivot portion 320, the sensing portion 322, and the bar assembly 324, respectively, except as otherwise specified. As shown in FIGS. 25-28, the pivot portion 420 is coupled to an upper end portion of the upright rail 400. Specifically, the fixed clevis 332 is fixedly coupled to the upright rail 400. The sensing portion 422 is coupled to an upper end portion of the upright rail 402.

Figure 28:
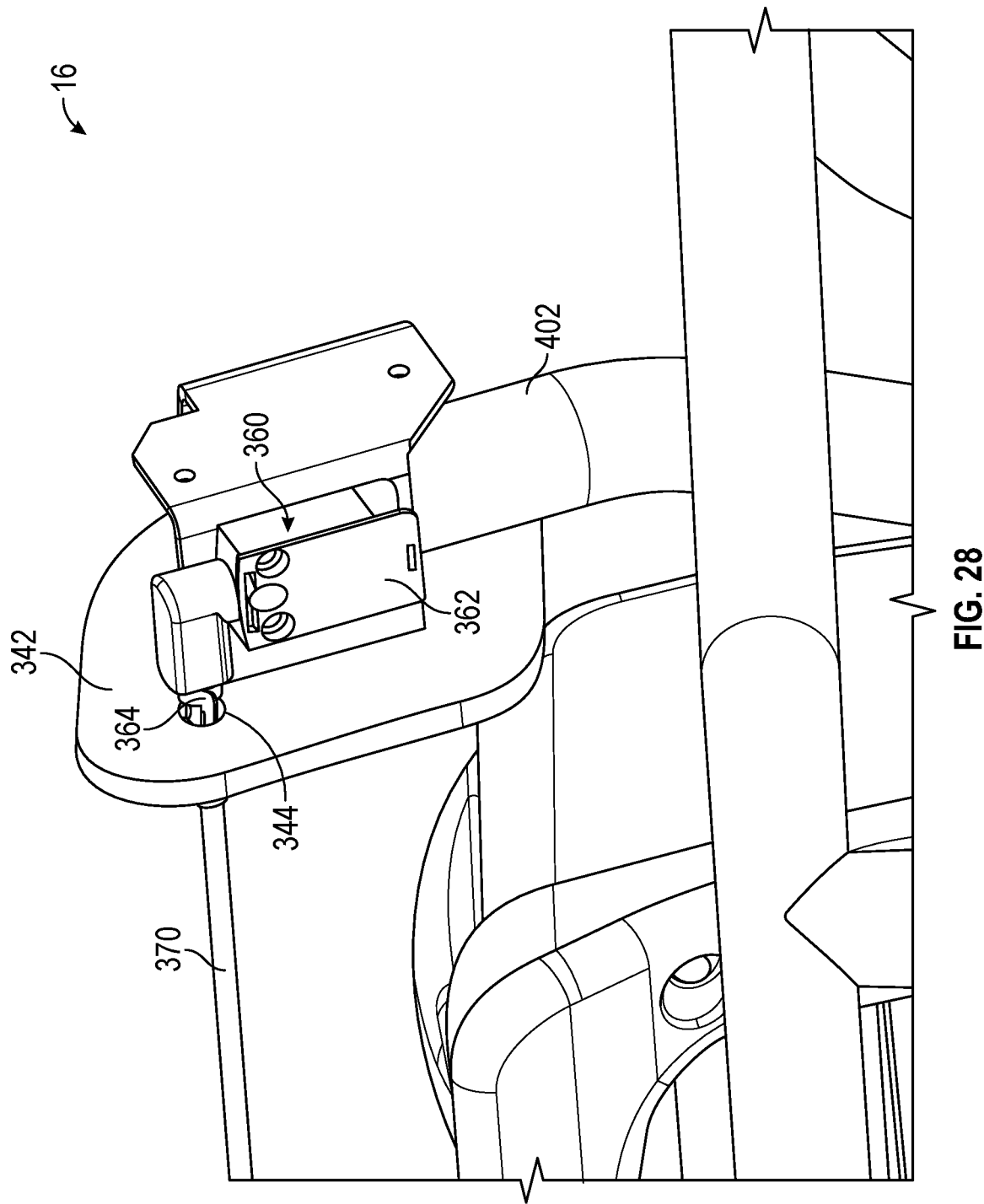
Figure 29:
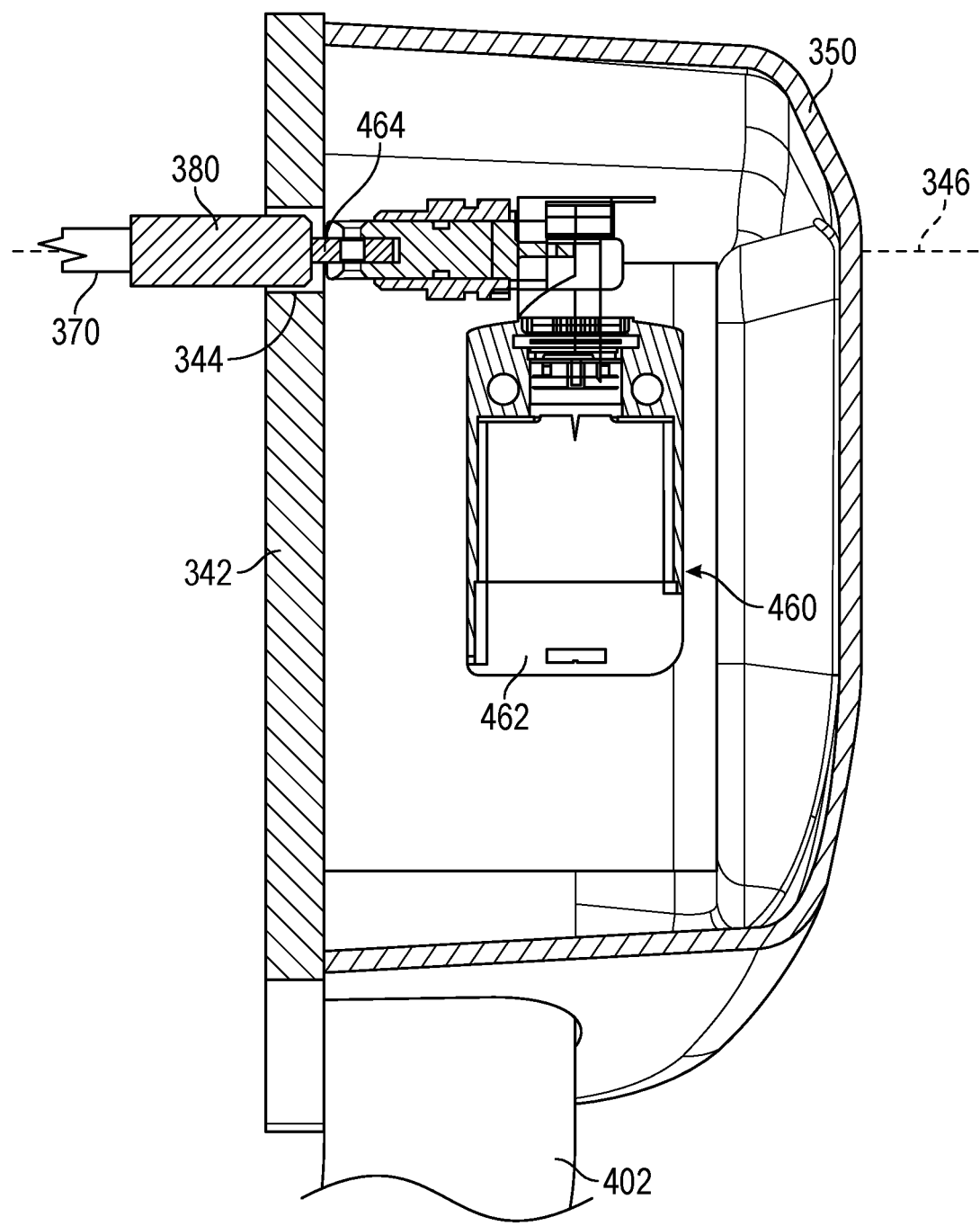
FIG. 29 is a section view of the user contact sensor of FIG. 25.

As shown in FIGS. 28 and 29, in the sensing portion 424, the sensor 360 is omitted and replaced with a microswitch or contacting switch, shown as switch assembly 460. The switch assembly 460 includes a main body, shown as switch body 462, and an interface or interface member, shown as button 464. The button 464 is positioned in alignment with the end aperture 344 such that the sensor end 380 of the bar assembly 424 engages the button 464 when the sensor end 380 is positioned within the end aperture 344. The button 464 is configured to move along a lateral axis 466. Accordingly, when sensor end 380 is positioned within the end aperture 344, the button 464 is depressed, activating the switch assembly 460. The switch assembly 460 may communicate similar signals with the controller 38 as the sensor 360. By way of example, the switch assembly 460 may provide a first signal to the controller 38 when the button 464 is depressed (i.e., the sensor end 380 is in the end aperture 344) and a second signal when the button 464 is not depressed (i.e., the sensor end 380 is not in the end aperture 344) (e.g., an indication that the sensor end 380 has exited the end aperture 344).

Figure 30:
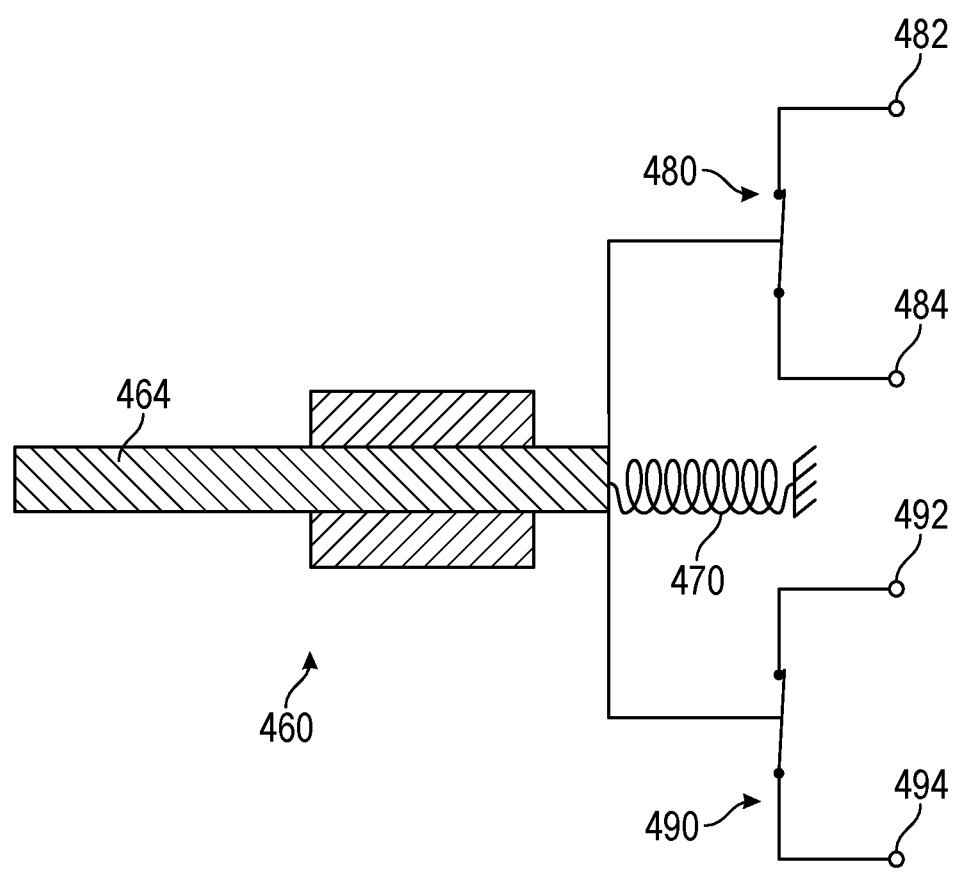
FIG. 30 is a schematic diagram of a switch assembly of the user contact sensor of FIG. 25.

Referring to FIG. 30, a diagram of the switch assembly 460 is shown according to an exemplary embodiment. In other embodiments, the switch assembly 460 is otherwise configured. As shown, the button 464 of the switch assembly 460 is biased away from a depressed position by a biasing element or biasing member, shown as spring 470. The switch assembly 460 includes a first switch 480 and a second switch 490 each coupled to the button 464. The first switch 480 includes contacts 482 and 484. The second switch 490 includes contacts 492 and 494. In some embodiments, the contact 484 and the contact 492 are connected (e.g., to a common ground). The spring 470 biases both the switch 480 and the switch 490 into a normally closed configuration.

During normal operation, the sensor end 380 depresses the button 464, holding the switch 480 and the switch 490 in an open configuration. With both the switch 480 and the switch 490 in the open configuration, the switch assembly 460 provides the first signal. When the sensor end 380 leaves the end aperture 344, the spring 470 forces the switch 480 and the switch 490 to close. When one or both of the switch 480 and the switch 490 read as closed, the switch assembly 460 provides the second signal. The use of two switches may ensure functionality of the switch assembly 460, even if one of the switches fails.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A lift device comprising:
    a chassis;
    a platform configured to support a user;
    a lift assembly coupling the platform to the chassis;
    an actuator configured to at least one of (a) move the platform relative to the chassis or (b) propel the chassis;
    a sensor assembly, comprising:
        a bar including a first end portion coupled to the platform and a second end portion opposite the first end portion;
        a housing defining an aperture sized to receive the second end portion of the bar; and
        a sensor configured to provide a signal in response to at least one of (a) the second end portion of the bar contacting the sensor or (b) the second end portion of the bar exiting the aperture; and
    a controller operatively coupled to the sensor and the actuator and configured to control the actuator based on the signal from the sensor.

2. The lift device of claim 1, wherein the sensor is positioned to contact the second end portion when the second end portion is received within the aperture.

3. The lift device of claim 2, wherein the bar includes a resilient member extending between the first end portion and the second end portion, and wherein the resilient member is configured to resist the second end portion exiting the aperture.

4. The lift device of claim 1, further comprising a hinge pivotally coupling the first end portion to the platform.

5. The lift device of claim 4, wherein the hinge includes:
    a first hinge portion fixedly coupled to the platform; and
    a second hinge portion pivotally coupled to the first hinge portion and defining a bar aperture that receives the bar therethrough, wherein the bar is repositionable through the bar aperture to adjust a position of the second end portion of the bar.

6. The lift device of claim 1, further comprising a plate coupling the first end portion of the to the platform, wherein the first end portion includes a threaded portion, wherein the sensor assembly further includes a fastener in threaded engagement with the threaded portion and engaging a first side of the plate.

7. The lift device of claim 6, wherein the fastener is a first fastener, wherein the sensor assembly further includes a second fastener in threaded engagement with the threaded portion and engaging a second side of the plate opposite the first side such that the plate extends between the first fastener and the second fastener.

8. The lift device of claim 1, wherein the sensor is selectively repositionable relative to the platform to adjust a position of the sensor relative to the second end portion of the bar.

9. The lift device of claim 1, further comprising a user interface coupled to the platform and operatively coupled to the controller, wherein the controller is configured to control the actuator based on an instruction received by the user interface, and wherein the bar extends above the user interface.

10. The lift device of claim 1, wherein the sensor is configured to provide the signal in response to the second end portion of the bar exiting the aperture.

11. The lift device of claim 10, wherein the sensor includes a proximity sensor configured to indicate when the second end portion of the bar is within a threshold distance of the proximity sensor.

12. The lift device of claim 11, wherein the proximity sensor is configured to distinguish between a metallic object and a non-metallic object, and wherein the second end portion of the bar is metallic.

13. The lift device of claim 1, wherein the sensor is configured to provide the signal in response to the second end portion of the bar contacting the sensor.

14. The lift device of claim 13, wherein the sensor includes an interface member configured to engage the second end portion of the bar and a biasing element configured to bias the interface member toward the second end portion of the bar.

15. The lift device of claim 14, wherein the sensor includes a first switch and a second switch each coupled to the interface member and operatively coupled to the controller;
    wherein the first switch is configured to change from a first configuration to a second configuration in response to the second end portion of the bar contacting the interface member;
    wherein the second switch is configured to change from a first configuration to a second configuration in response to the second end portion of the bar contacting the interface member; and
    wherein, in response to an indication that at least one of (a) the first switch is in the first configuration of the first switch or (b) the second switch is in the first configuration of the second switch, the controller is configured to at least one of (a) stop movement of the actuator or (b) change a direction of the movement of the actuator.

16. A sensor assembly for a lift device, comprising:
    a rod including a first end portion, a second end portion opposite the first end portion, and a resilient member extending between the first end portion and the second end portion;

a hinge coupled to the first end portion of the rod and configured to pivotally couple the rod to a platform of the lift device;

a housing configured to be coupled to the platform, the housing defining an aperture sized to receive the second end portion of the rod; and a sensor coupled to the housing and configured to provide a signal in response at least one of (a) the second end portion of the rod contacting the sensor or (b) the second end portion of the rod exiting the aperture, wherein the resilient member is configured to apply a biasing force to resist movement of the second end portion away from the sensor.

17. The sensor assembly of claim 16, wherein the sensor includes a switch positioned to contact the second end portion of the rod when the second end portion is received within the aperture of the housing.

18. The sensor assembly of claim 16, wherein the sensor includes a proximity sensor configured to detect a presence of the second end portion within the aperture without the proximity sensor contacting the second end portion.

19. A lift device comprising:
a chassis;
a platform configured to support a user, the platform including a first rail and a second rail;
a user interface coupled to the platform and positioned between the first rail and the second rail;
a lift assembly coupling the platform to the chassis;
an actuator configured to at least one of (a) move the platform relative to the chassis or (b) propel the chassis;
a sensor assembly, comprising:
a rod including (a) a first end portion coupled to the first rail, (b) a second end portion opposite the first end portion, and (c) a resilient member extending between the first end portion and the second end portion;
a plate coupled to the second rail and defining an aperture sized to receive the second end portion of the rod;
a sensor positioned to detect the second end portion of the rod when the second end portion of the rod is received by the aperture; and
a controller operatively coupled to the sensor and the actuator and configured to control the actuator in response to an indication from the sensor that the second end portion of the rod has exited the aperture.

20. The lift device of claim 19, wherein the resilient member is configured to apply a biasing force to resist the second end portion of the rod exiting the aperture.

* * * * *